United States Patent
Cheng et al.

(10) Patent No.: US 11,590,609 B2
(45) Date of Patent: Feb. 28, 2023

(54) LASER SHOCK PEENING APPARATUSES AND METHODS

(71) Applicant: Purdue Research Foundation, West Lafayette, IN (US)

(72) Inventors: Gary J. Cheng, West Lafayette, IN (US); Yiliang Liao, West Lafayette, IN (US); Yingling Yang, Los Alamos, NM (US); Chang Ye, Cincinnati, OH (US)

(73) Assignee: Purdue Research Foundation, West Lafayette, IN (US)

( * ) Notice: Subject to any disclaimer, the term of this patent is extended or adjusted under 35 U.S.C. 154(b) by 218 days.

(21) Appl. No.: 13/744,941

(22) Filed: Jan. 18, 2013

(65) Prior Publication Data
US 2013/0180969 A1 Jul. 18, 2013

Related U.S. Application Data

(60) Provisional application No. 61/587,815, filed on Jan. 18, 2012, provisional application No. 61/653,050, filed on May 30, 2012.

(51) Int. Cl.
*B23K 26/356* (2014.01)

(52) U.S. Cl.
CPC .................. *B23K 26/356* (2015.10)

(58) Field of Classification Search
CPC ............ B23K 26/0066; B23K 26/0069; B23K 26/0081

(Continued)

(56) References Cited

U.S. PATENT DOCUMENTS 5,560,825 A * 10/1996 Shafer .................... B01D 29/44
137/547
5,861,067 A * 1/1999 Hetzner ................... C21D 1/09
148/326

(Continued)

FOREIGN PATENT DOCUMENTS

JP 2006159290 6/2006
JP 4786470 3/2008

(Continued)

OTHER PUBLICATIONS

Tani, G. Warm Laser Shock Peening: New developments and process optimization, CIRP Annals—Manufacturing Technology, vol. 60 (2011), pp. 219-221 (Year: 2011).*

(Continued)

*Primary Examiner* — Tu B Hoang
*Assistant Examiner* — Alba T Rosario-Aponte
(74) *Attorney, Agent, or Firm* — Brian W. Chellgren; John V. Daniluck; Dentons Bingham Greenebaum LLP

(57) ABSTRACT

Methods and apparatuses for processing materials to enhancing the material's surface strength, improving the material's cyclic and thermal stability of microstructures, and extend the material's fatigue performance. Embodiments include laser shock peening at material temperatures that are moderately elevated (from the material's perspective) above room temperature. Alternate embodiments include laser shock peening at very cold (cryogenic) material temperatures. Still further embodiments include laser shock peening while covering the surface of the material being processed with an active agent that interacts with the laser energy and enhances the pressure exerted on the surface.

21 Claims, 33 Drawing Sheets

(58) Field of Classification Search
USPC .............. 219/121.85, 121.6, 121.69, 121.66, 219/121.64
See application file for complete search history.

(56) References Cited

U.S. PATENT DOCUMENTS

| | | | |
|---|---|---|---|
| 7,304,266 B2 | 12/2007 | Mannava et al. | |
| 8,349,713 B2 | 1/2013 | Cheng et al. | |
| 8,499,599 B2 | 8/2013 | Cheng et al. | |
| 8,939,107 B2 | 1/2015 | Yang et al. | |
| 2007/0039395 A1* | 2/2007 | Gupta | C03C 17/34 |
| | | | 73/800 |
| 2007/0039933 A1* | 2/2007 | Cheng | B23K 26/18 |
| | | | 219/121.69 |
| 2007/0051336 A1* | 3/2007 | Barth | C22F 1/04 |
| | | | 123/193.5 |
| 2008/0105666 A1 | 5/2008 | Adachi et al. | |
| 2009/0199930 A1* | 8/2009 | Wright | C21D 1/22 |
| | | | 148/226 |
| 2010/0170877 A1* | 7/2010 | Sano | B23K 26/0066 |
| | | | 219/72 |
| 2011/0283762 A1* | 11/2011 | Cheng | B21D 26/06 |
| | | | 72/56 |
| 2013/0075377 A1 | 3/2013 | Cheng et al. | |
| 2013/0140517 A1 | 6/2013 | Tang et al. | |
| 2016/0144453 A1 | 5/2016 | Cheng et al. | |

FOREIGN PATENT DOCUMENTS

| | | |
|---|---|---|
| JP | 4786470 | 10/2011 |
| WO | 2005005069 | 4/2005 |

OTHER PUBLICATIONS

Fundamental Manufacturing Processes Study Guide, DV03PUB24, Heat Treating, Society of Manufacturing Engineers, 7 pages.

* cited by examiner

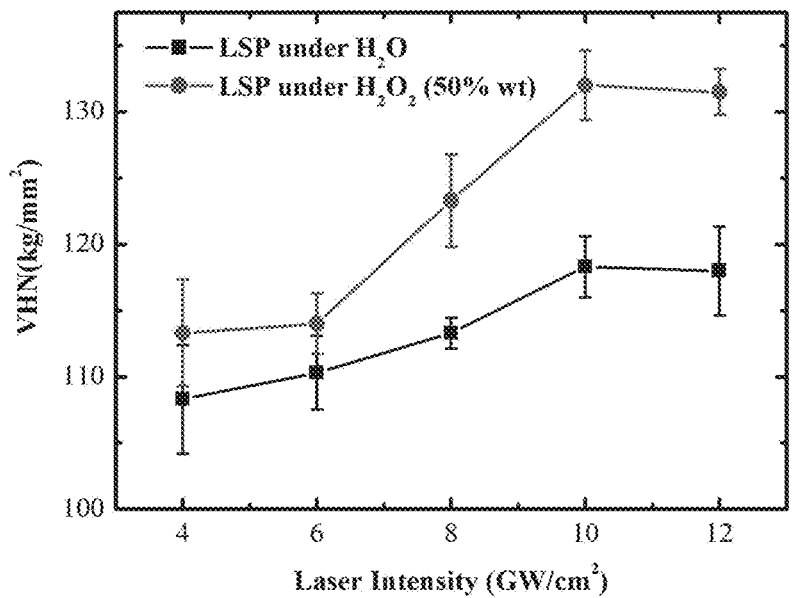
(A)
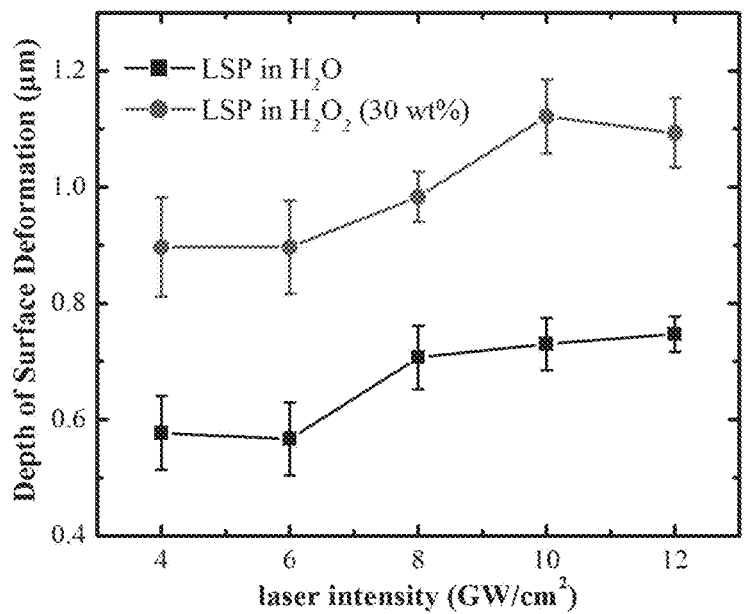
(B)
FIG. 1.1

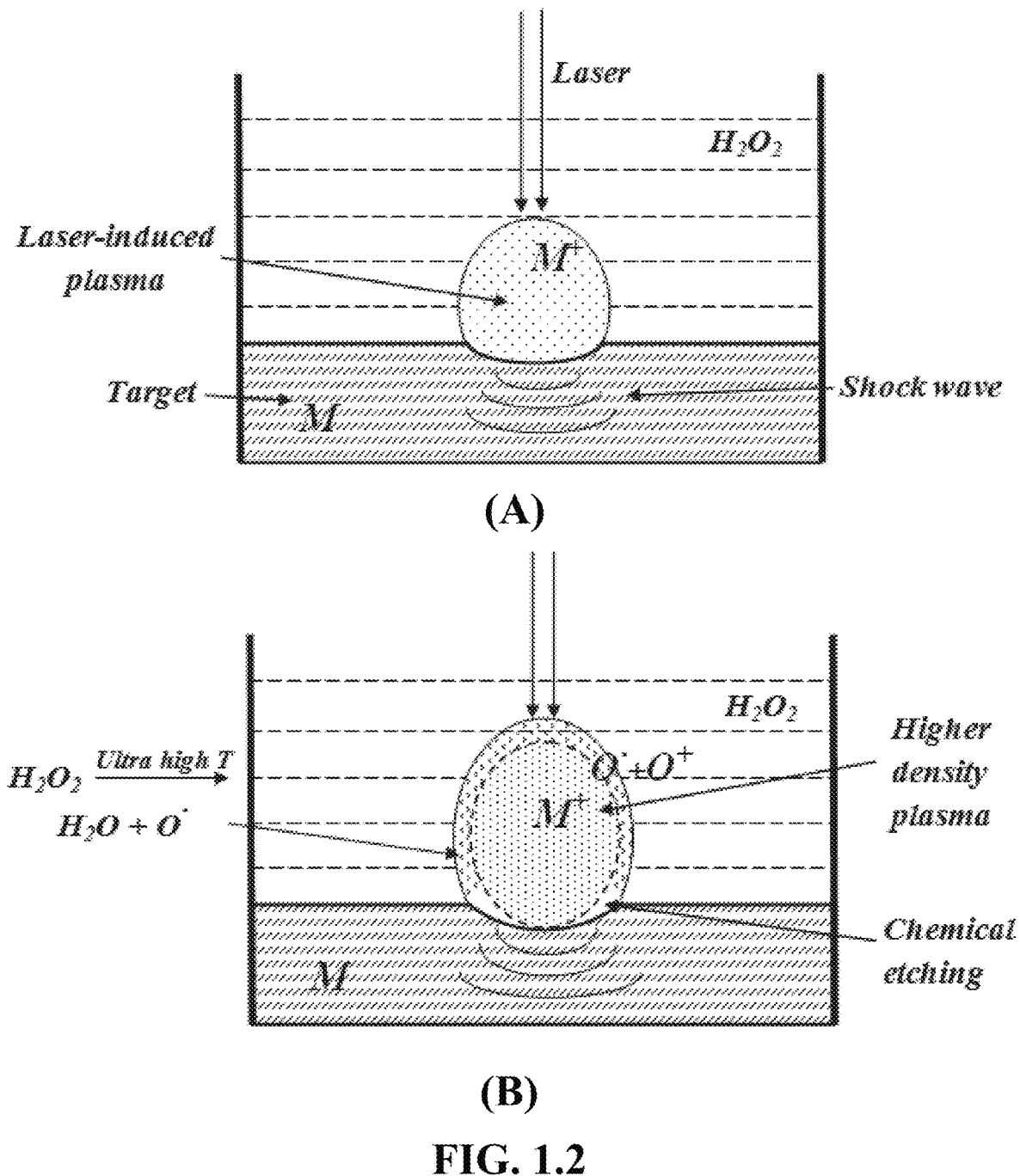
FIG. 1.2

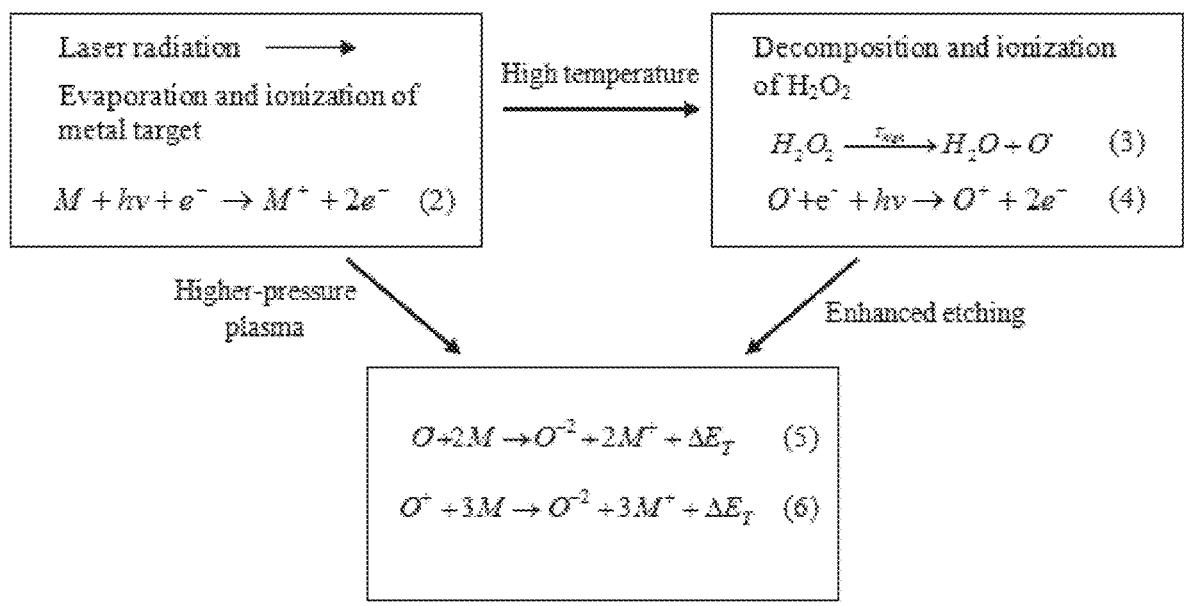
FIG. 1.3

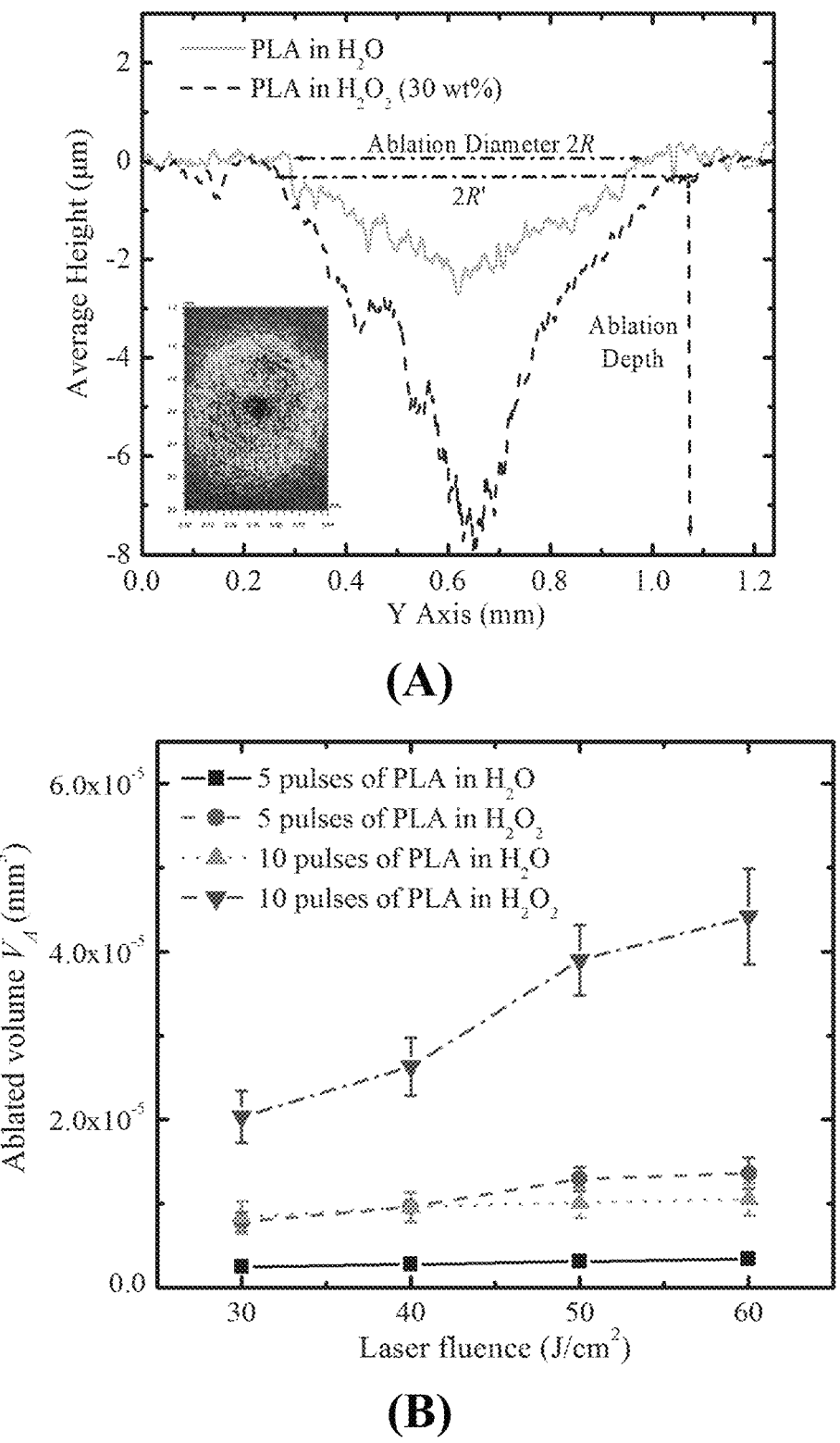
FIG. 1.4

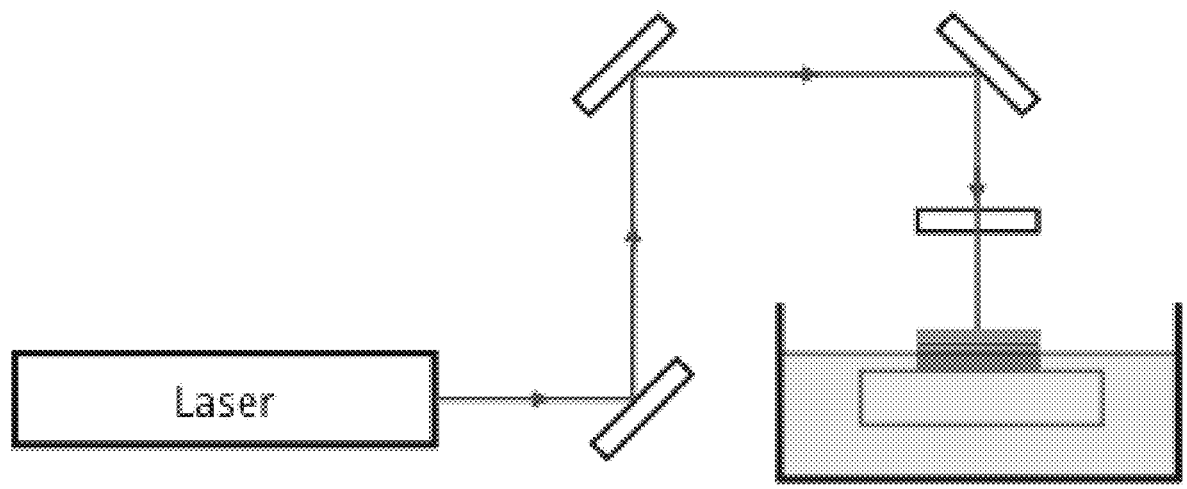
FIG. 2.1
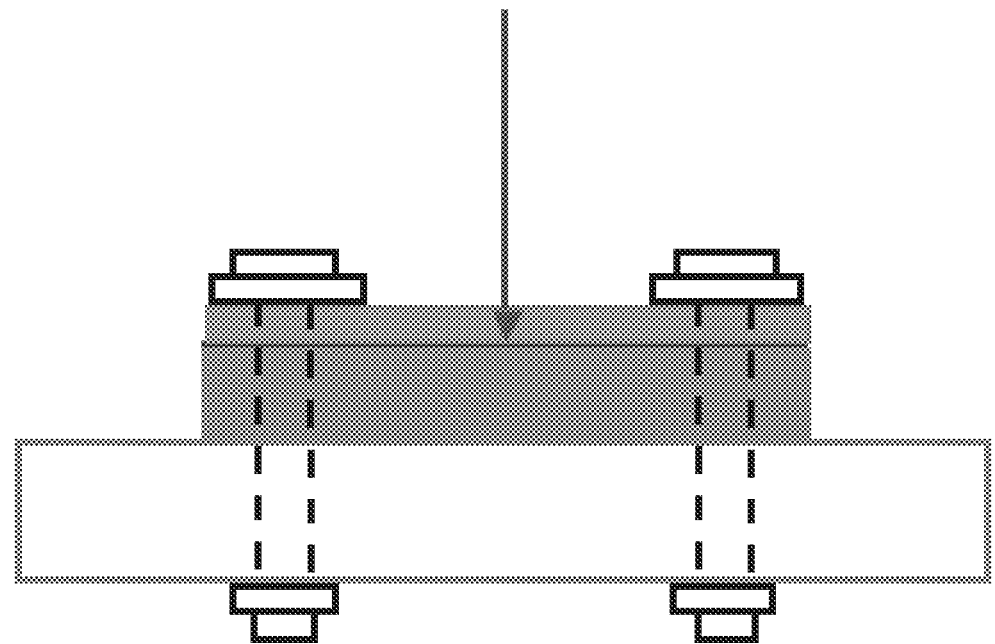
FIG. 2.2a

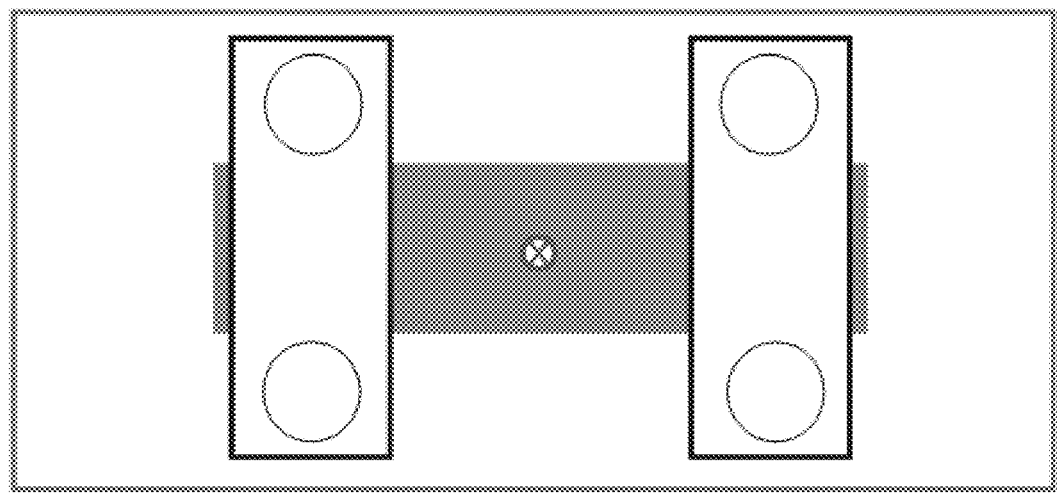
FIG. 2.2b
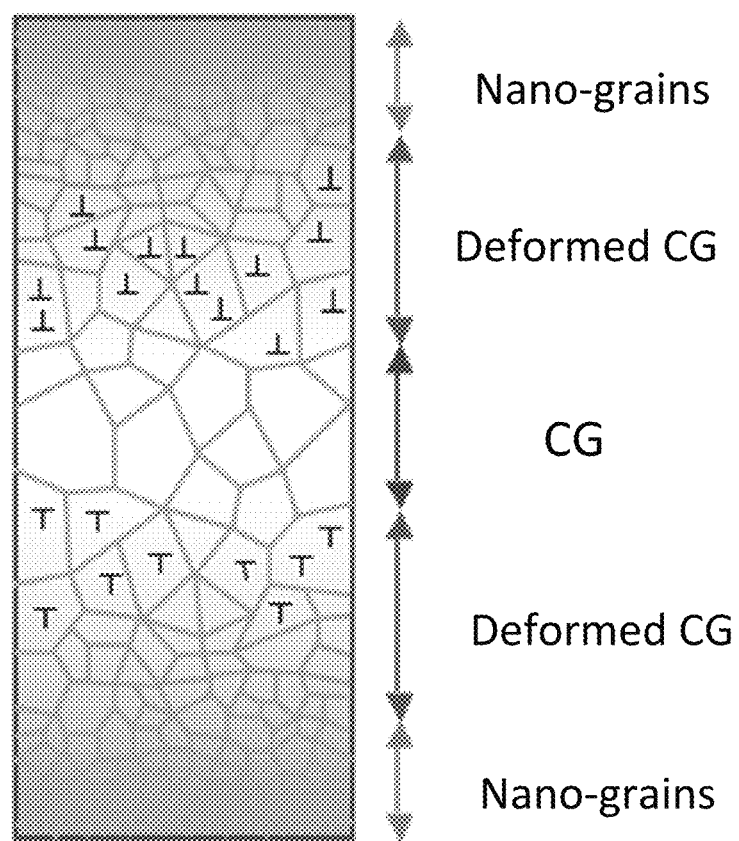
FIG. 2.3

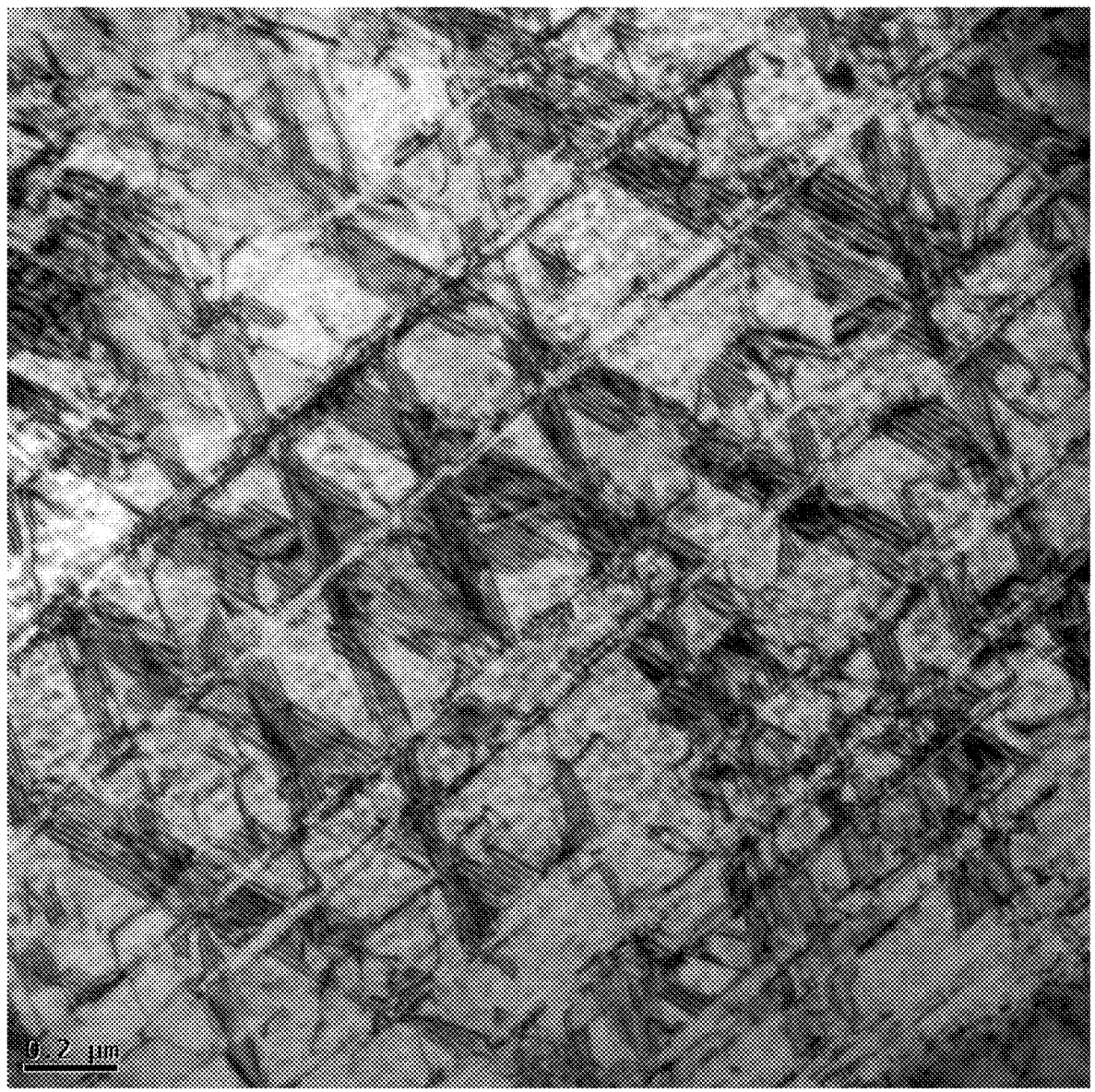
FIG. 2.4

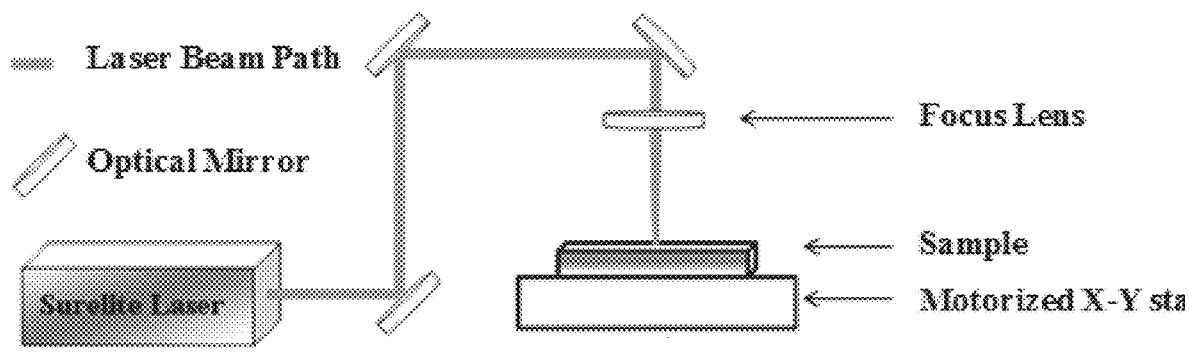
FIG. 3.1
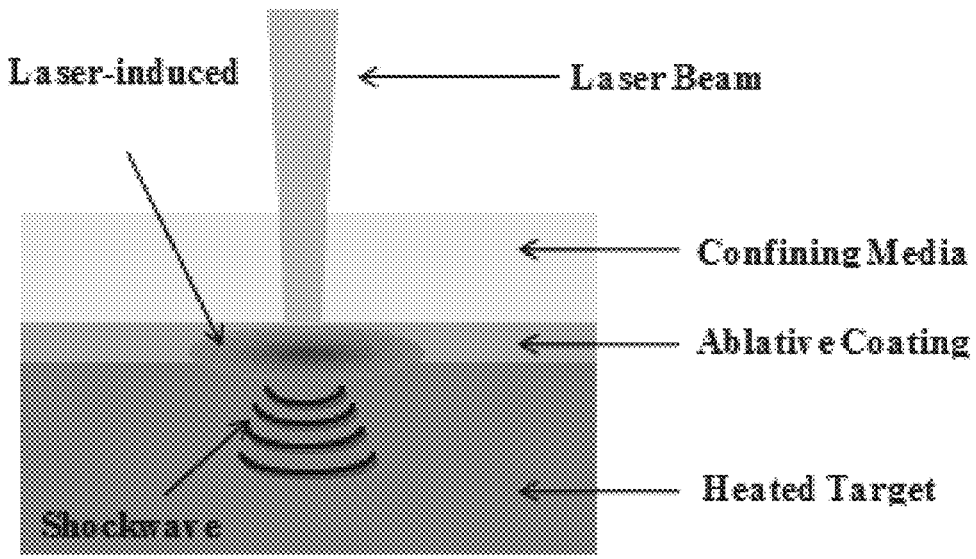
FIG. 3.2

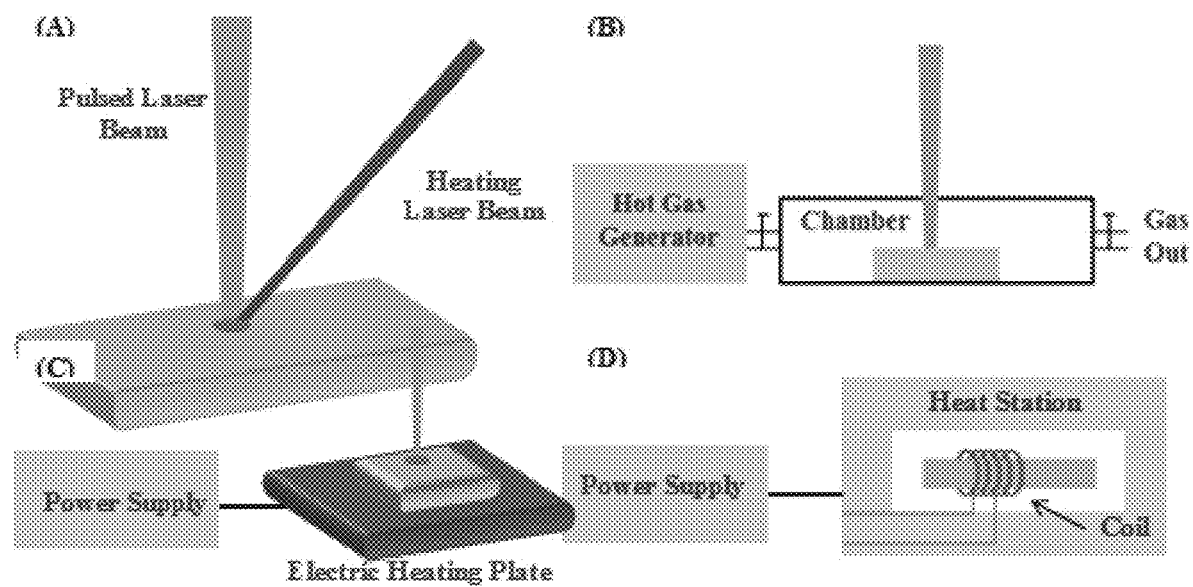
FIG. 3.3

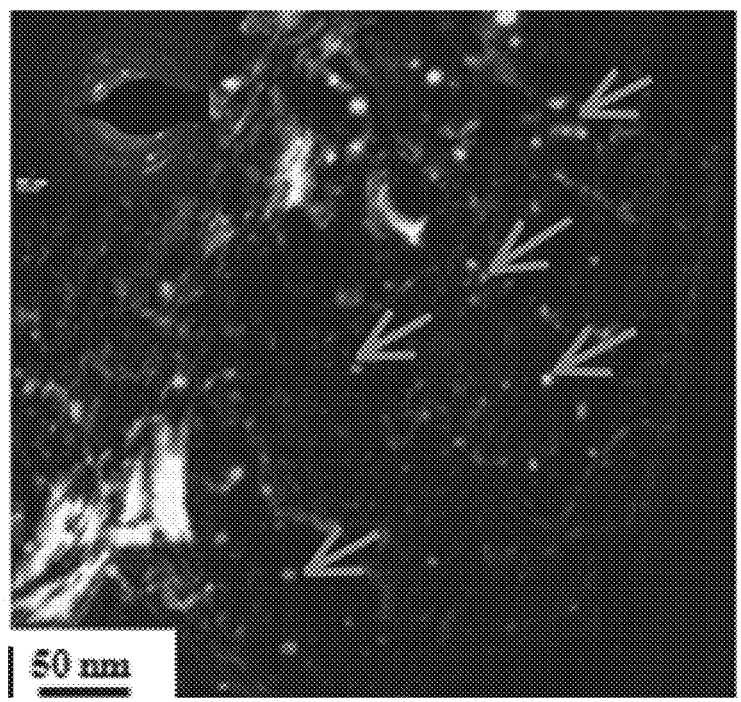
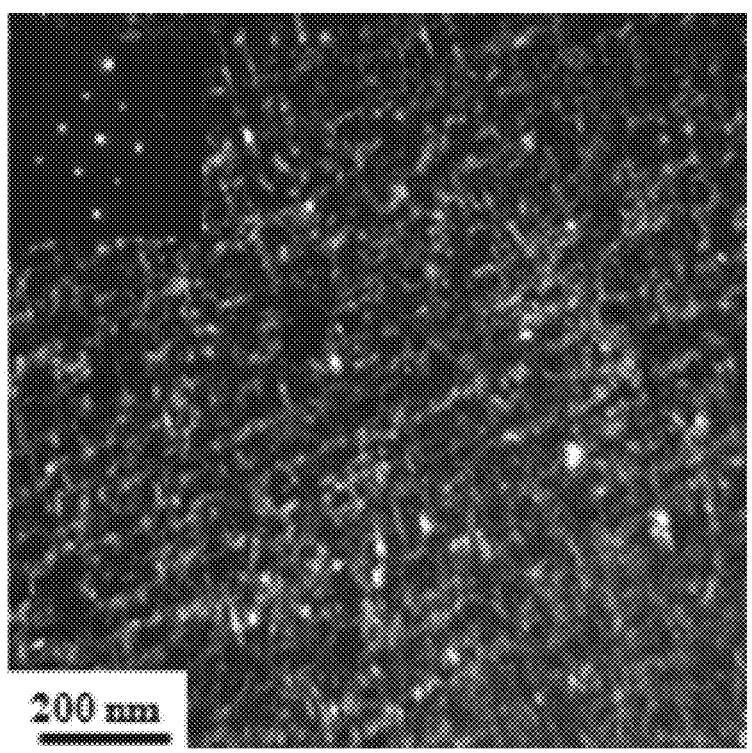
FIG. 3.4

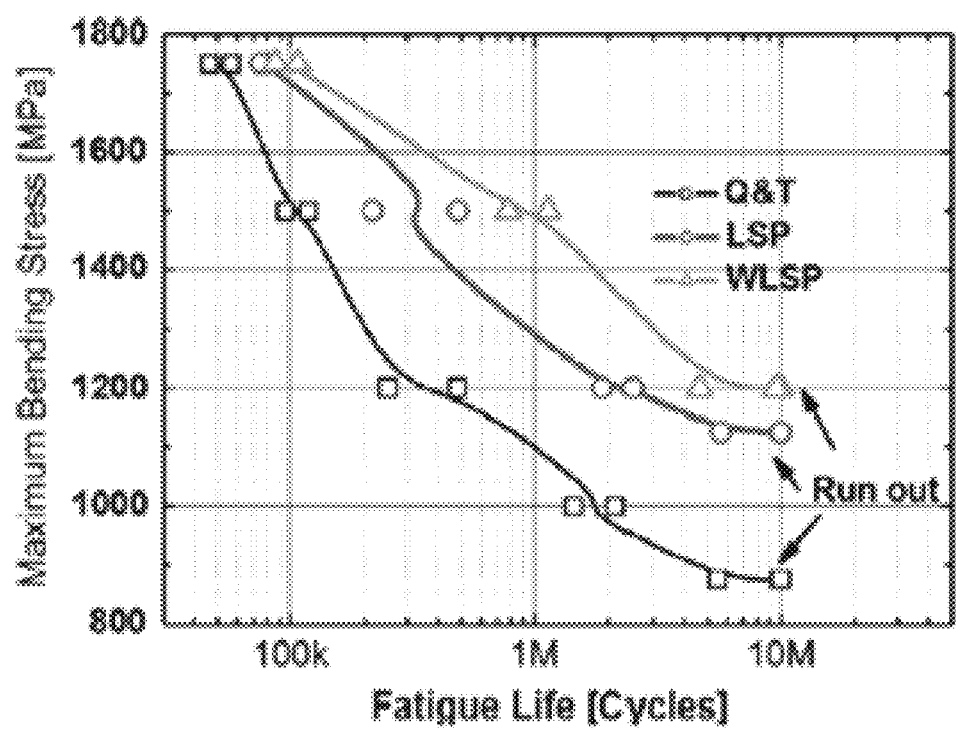
FIG. 3.5

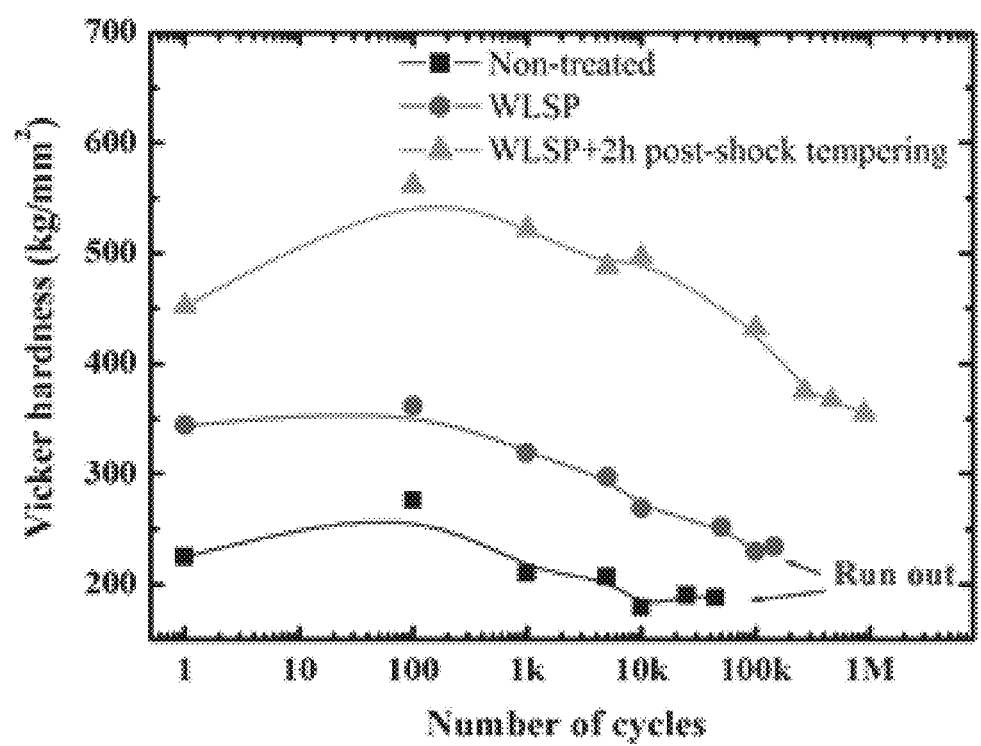
FIG. 3.6

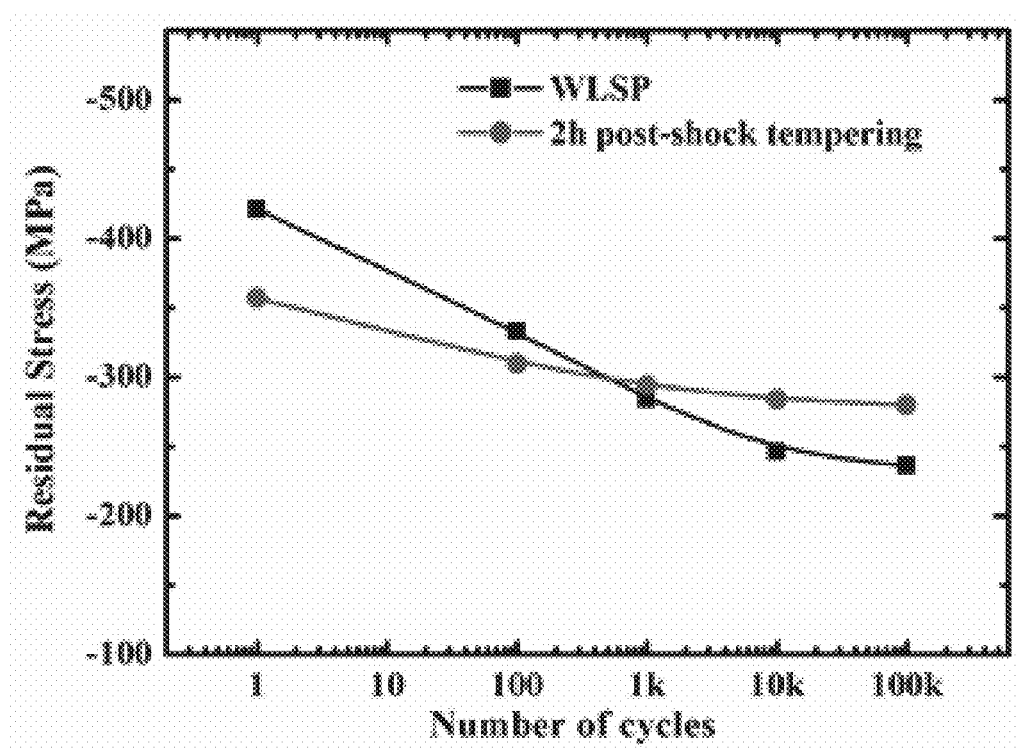
FIG. 3.7

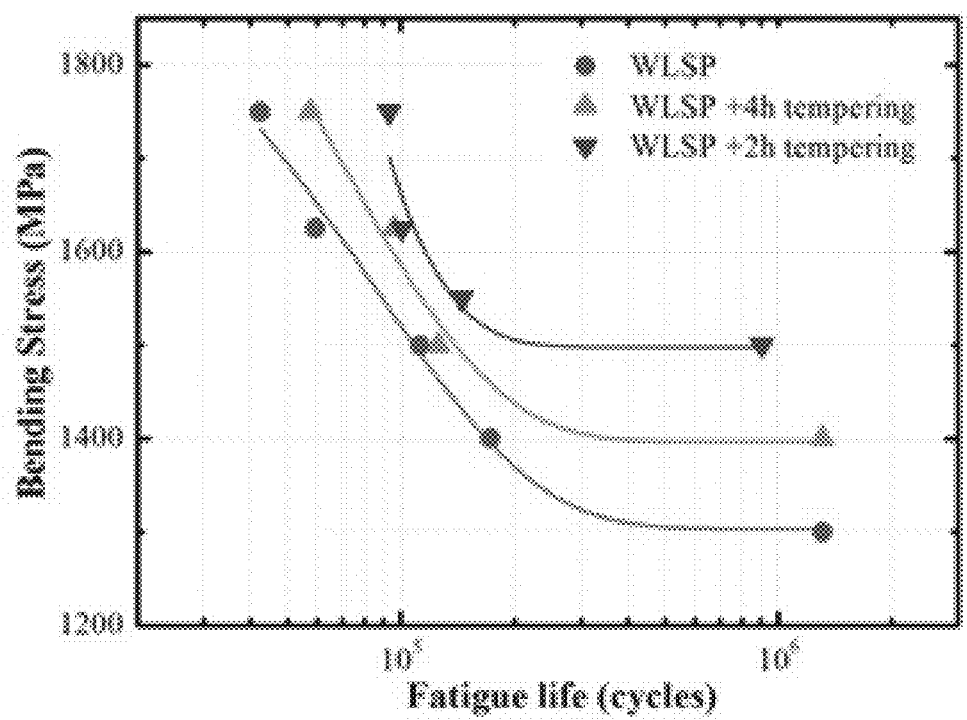
FIG. 3.8

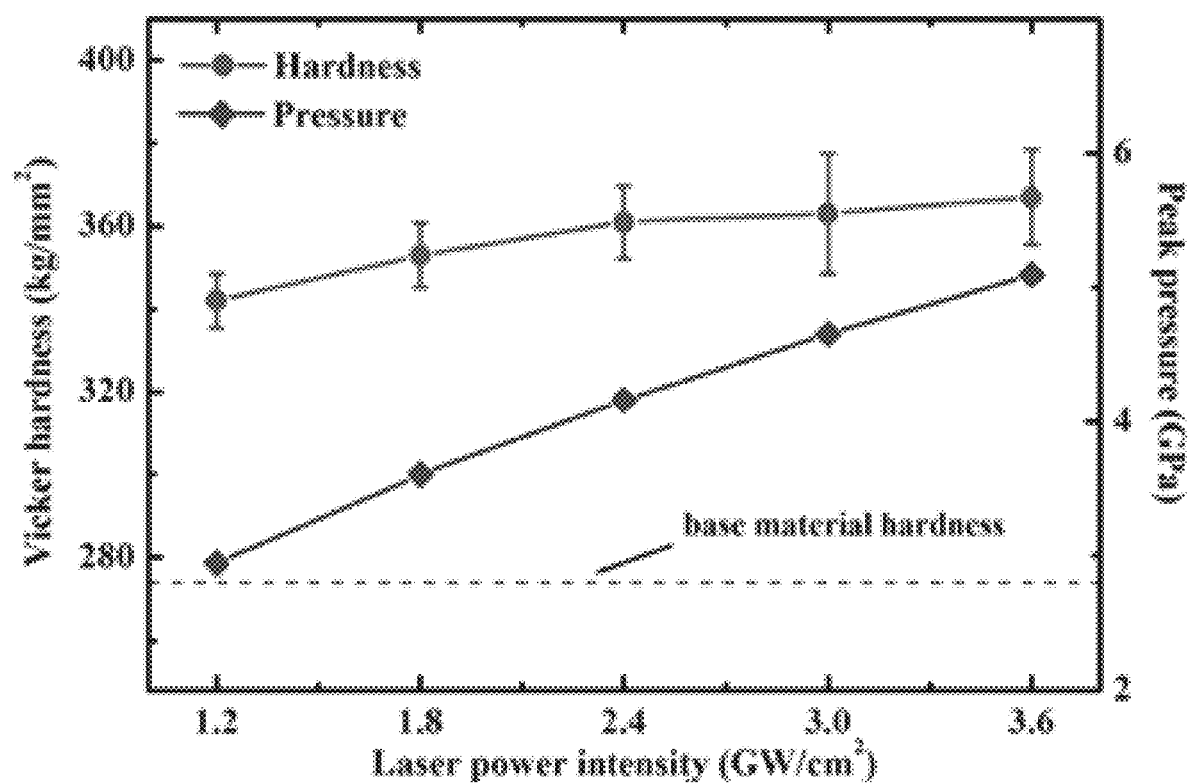
FIG. 4.1

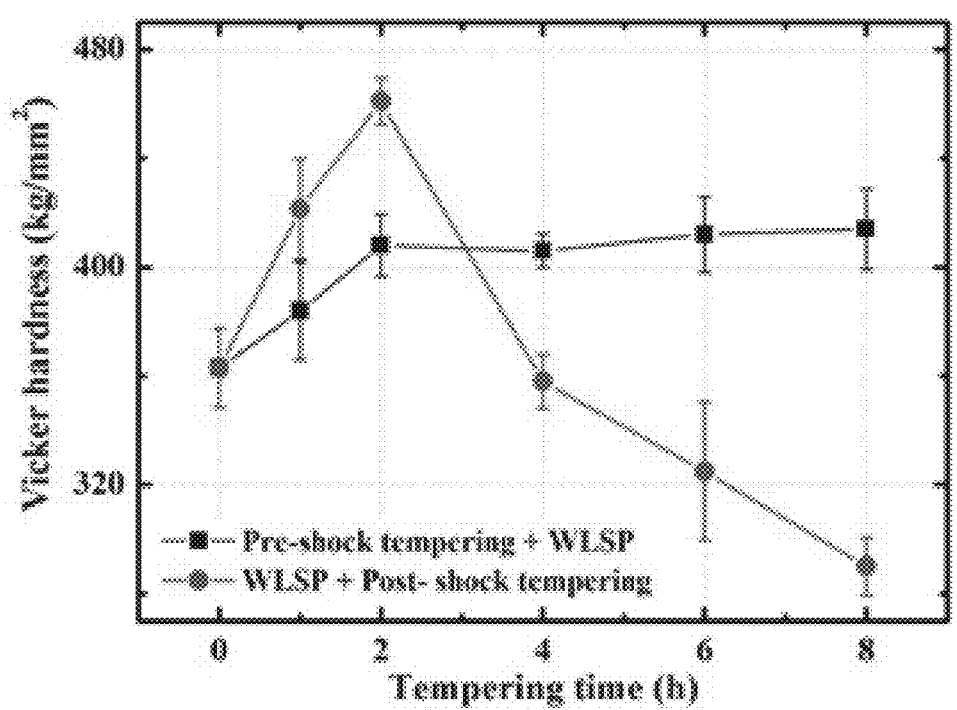
FIG. 4.2

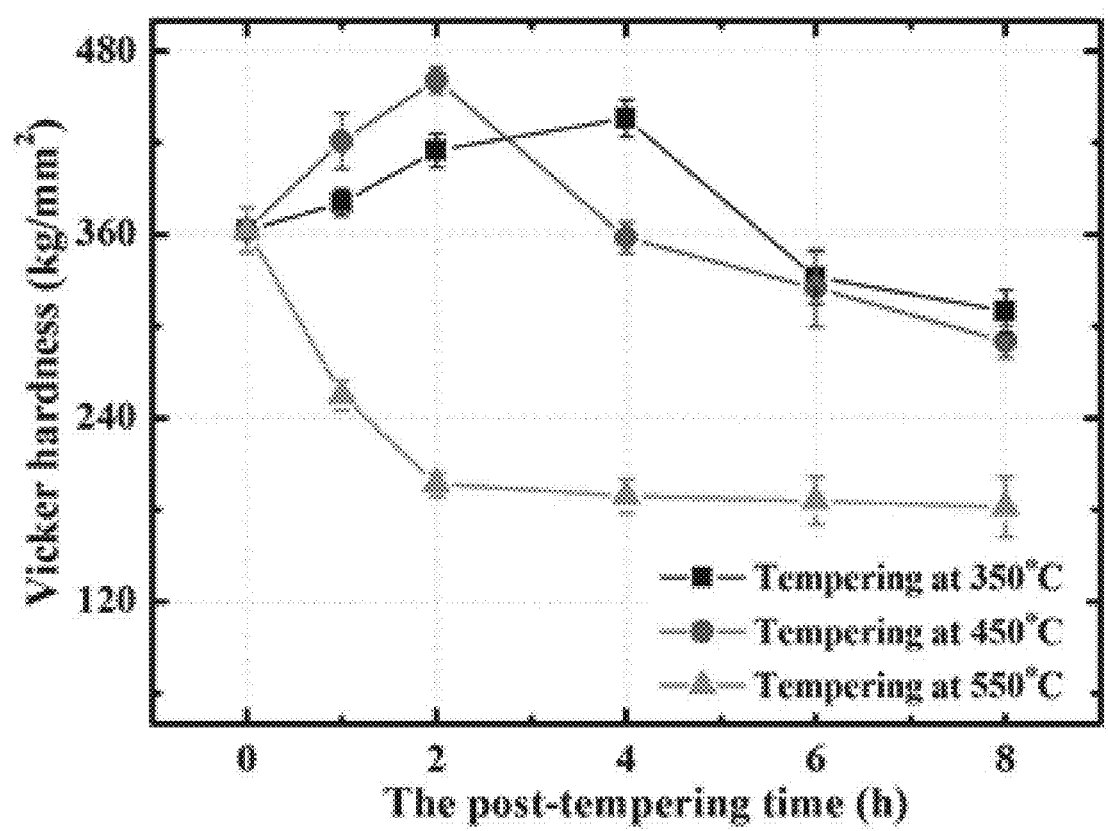
FIG. 4.3

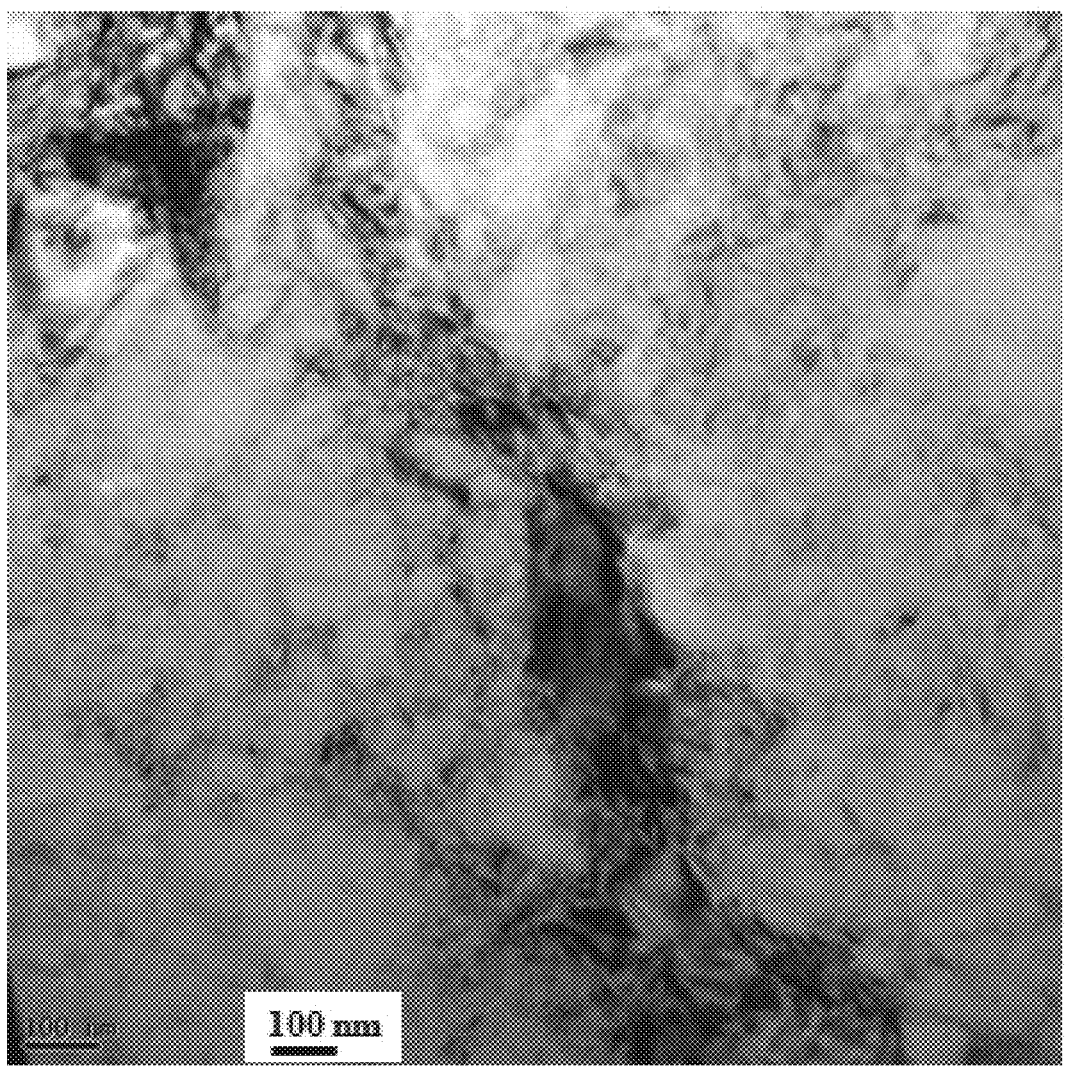
FIG. 4.4

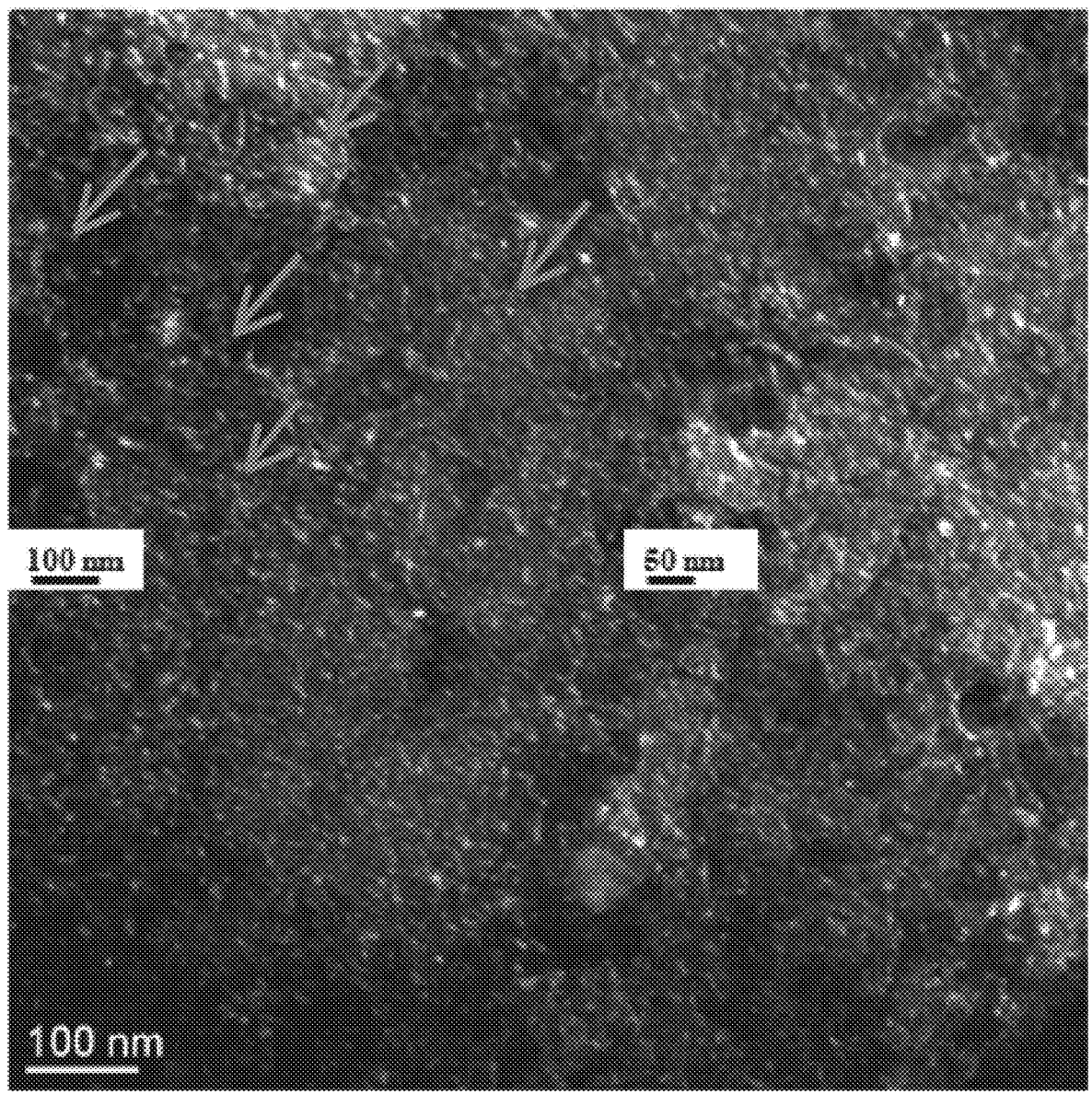
FIG. 4.5a

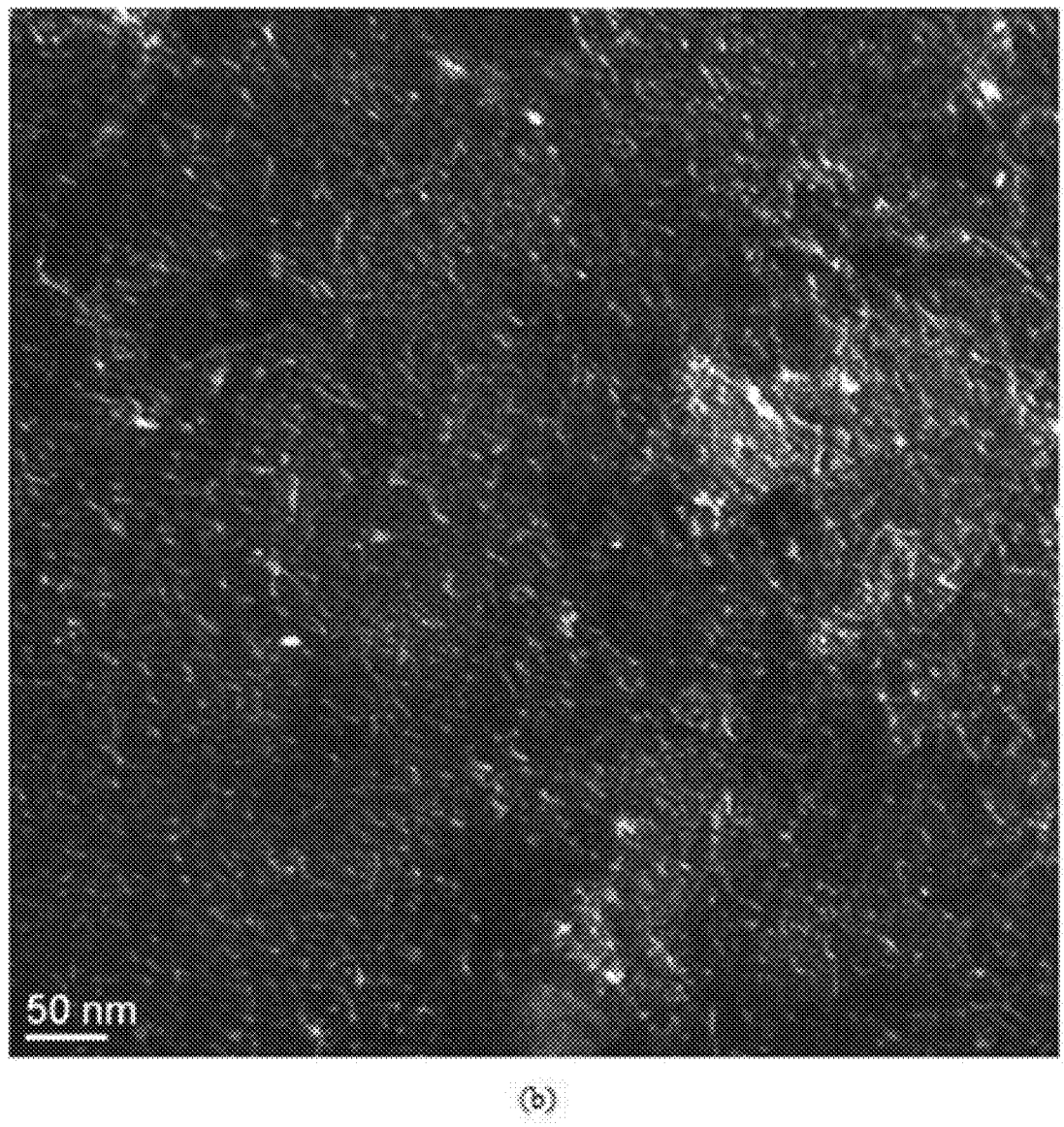
FIG. 4.5b

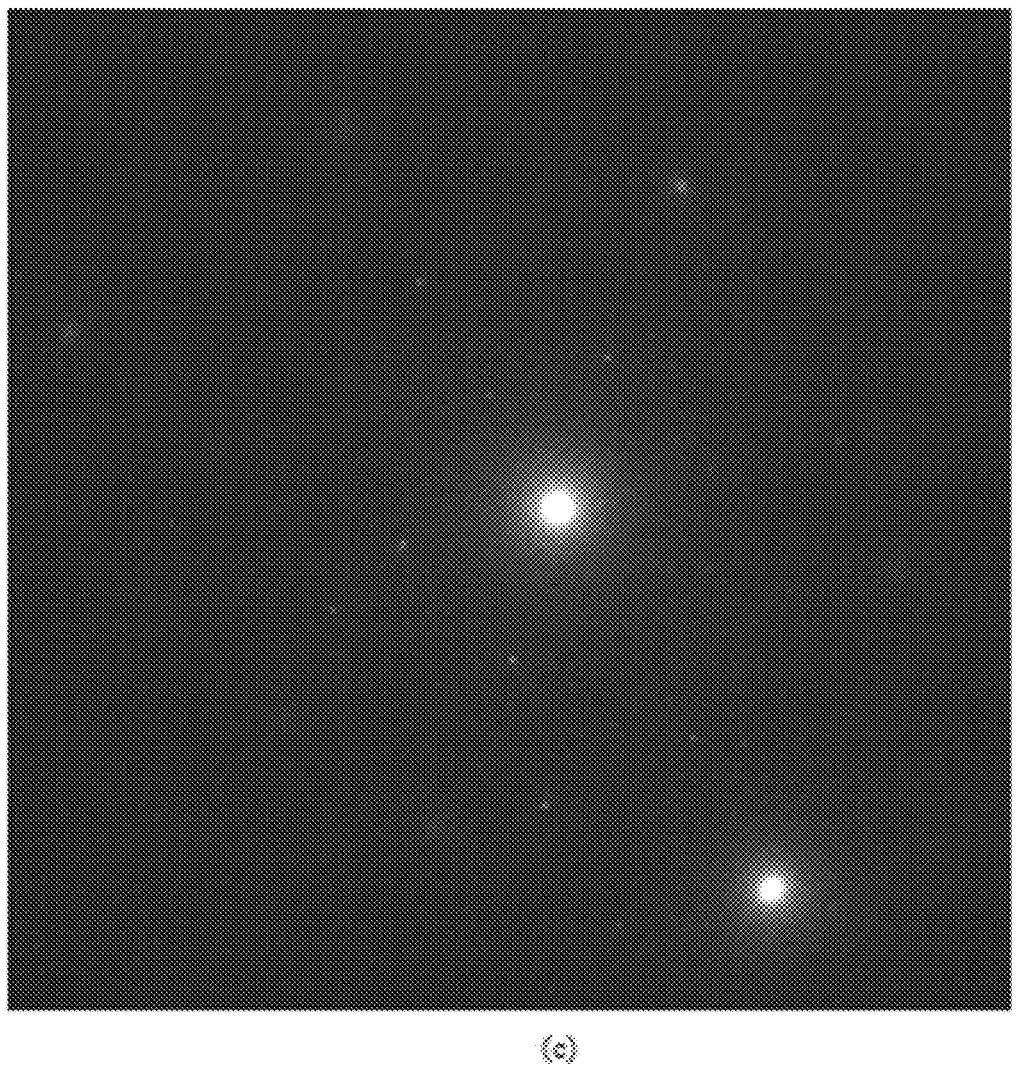
FIG. 4.5c

FIG. 4.6a

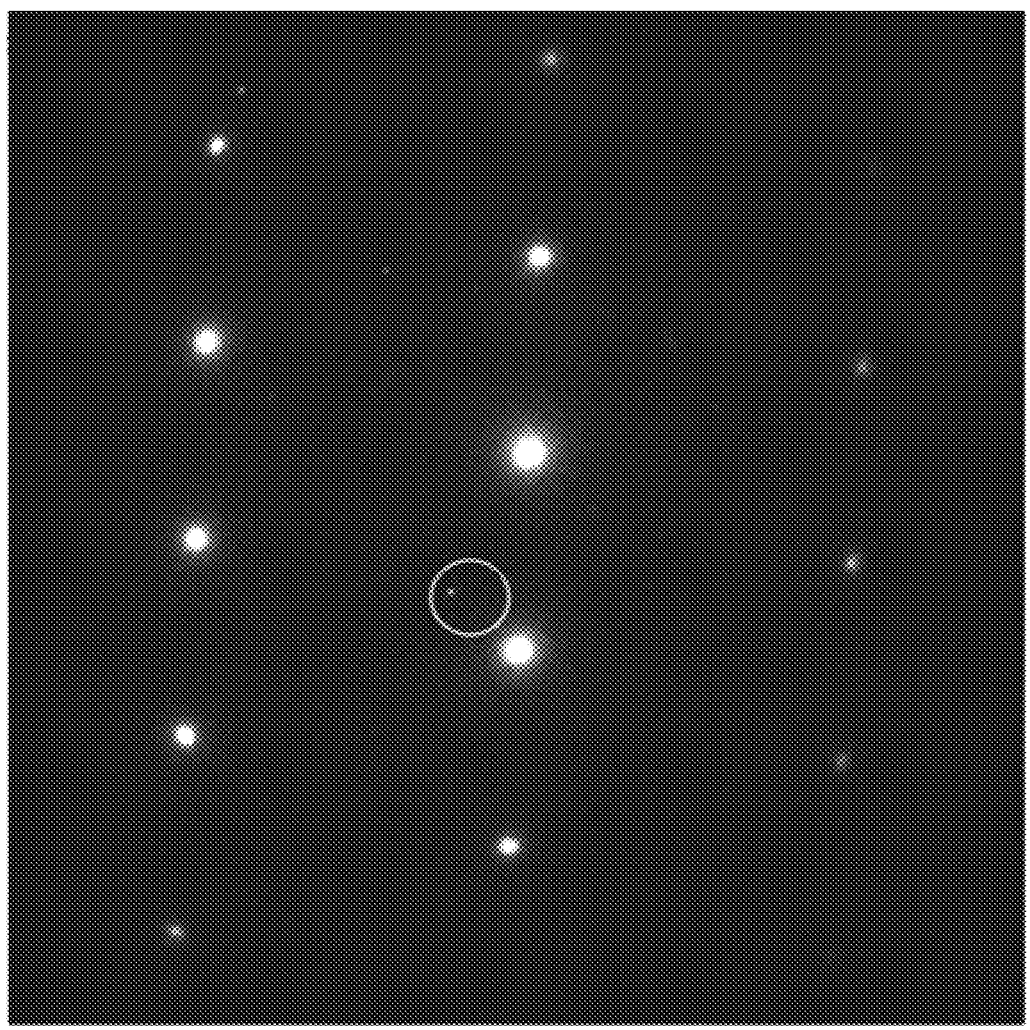
FIG. 4.6b

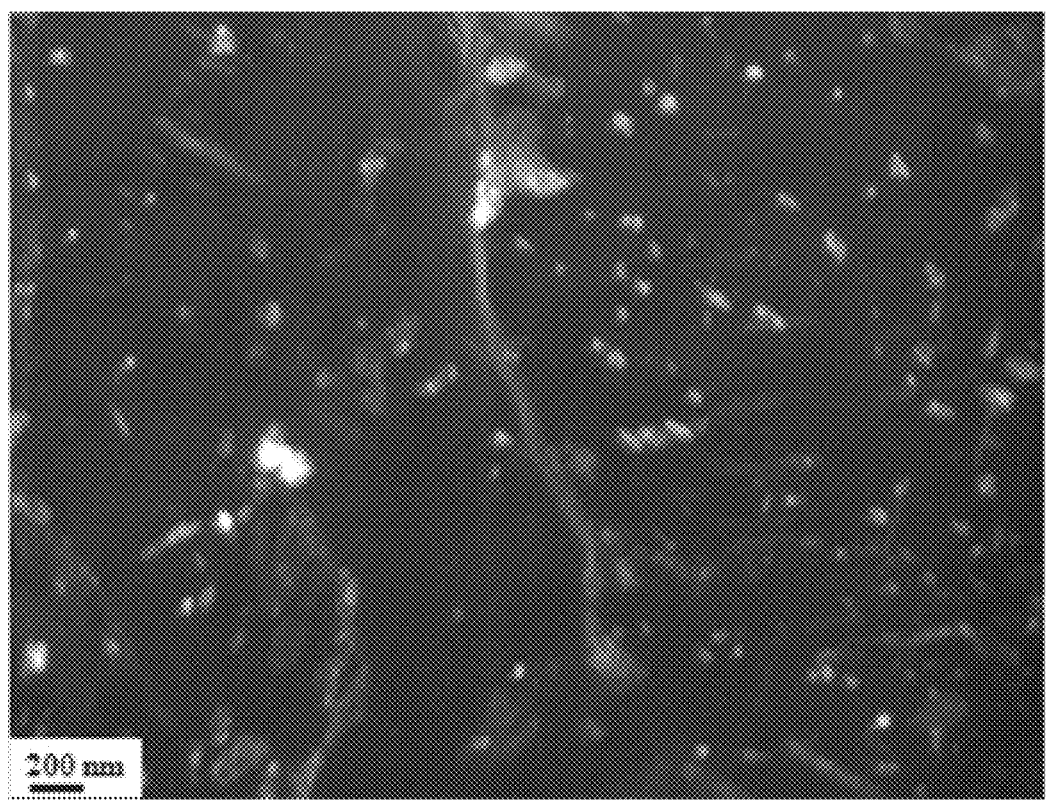
(c)
FIG. 4.6c

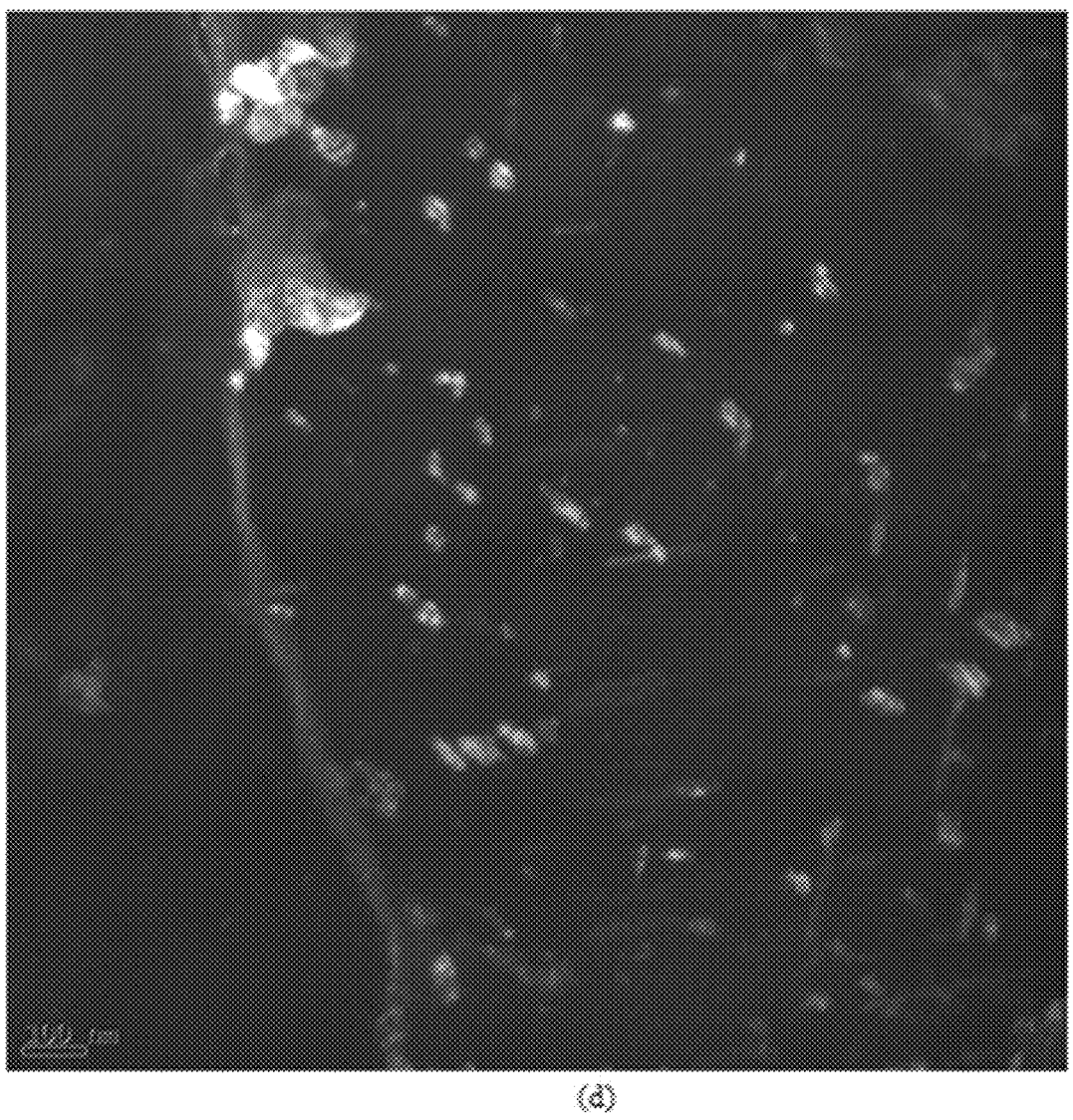
FIG. 4.6d

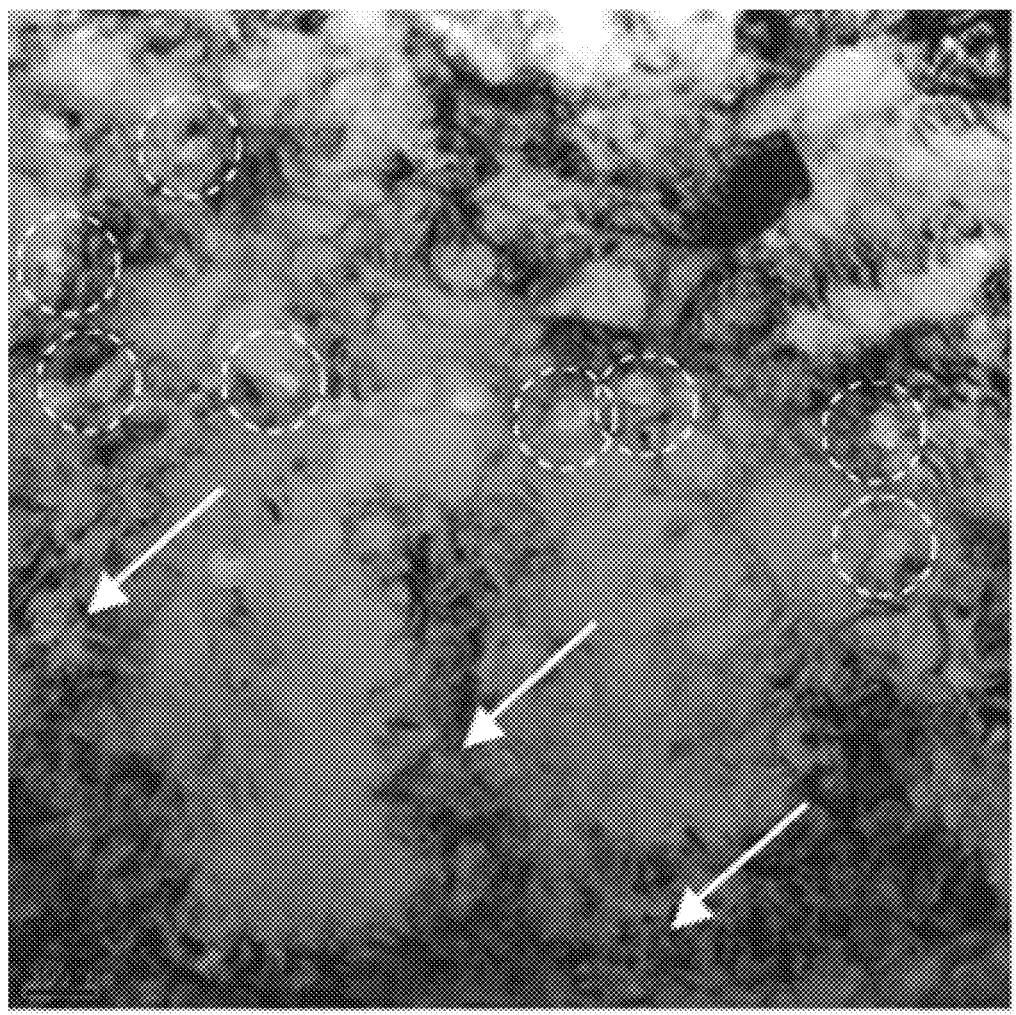
(a)
FIG. 4.7a

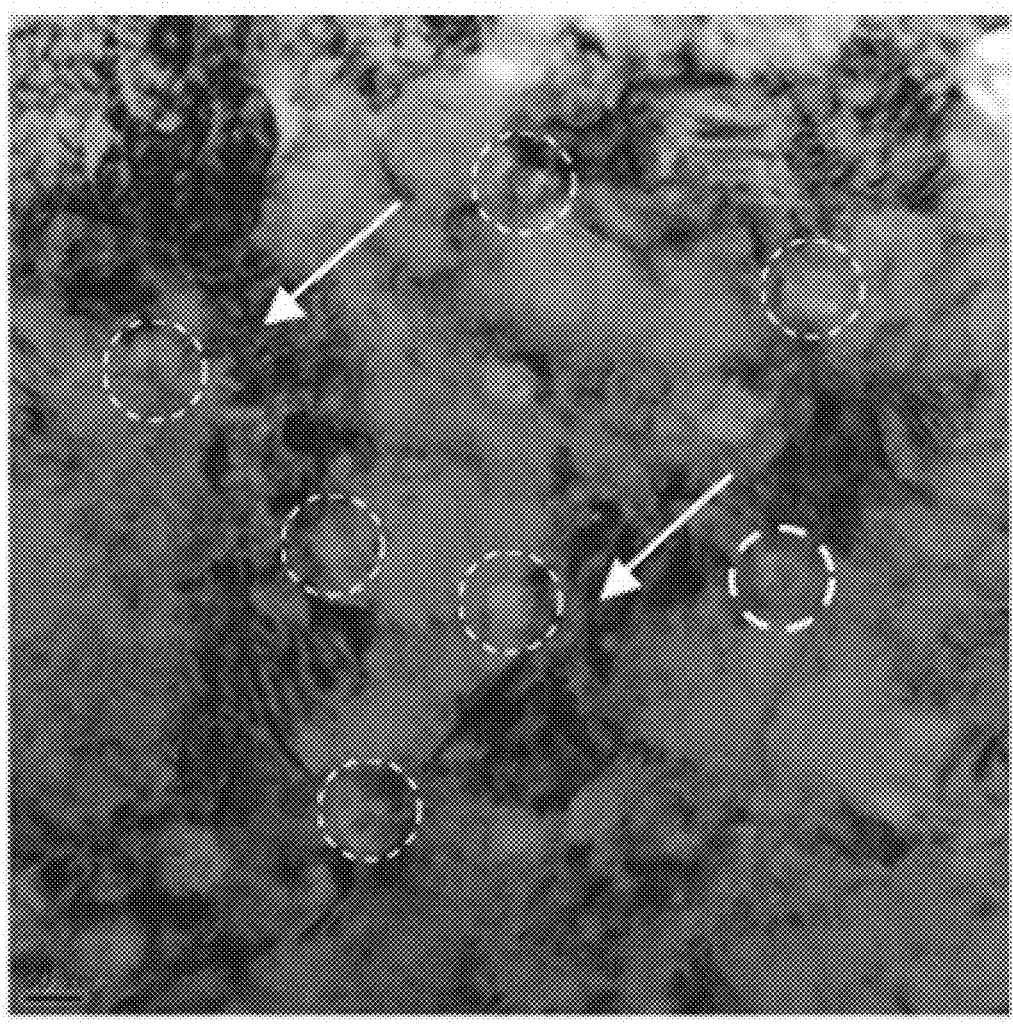
FIG. 4.7b

(c)
FIG. 4.7c

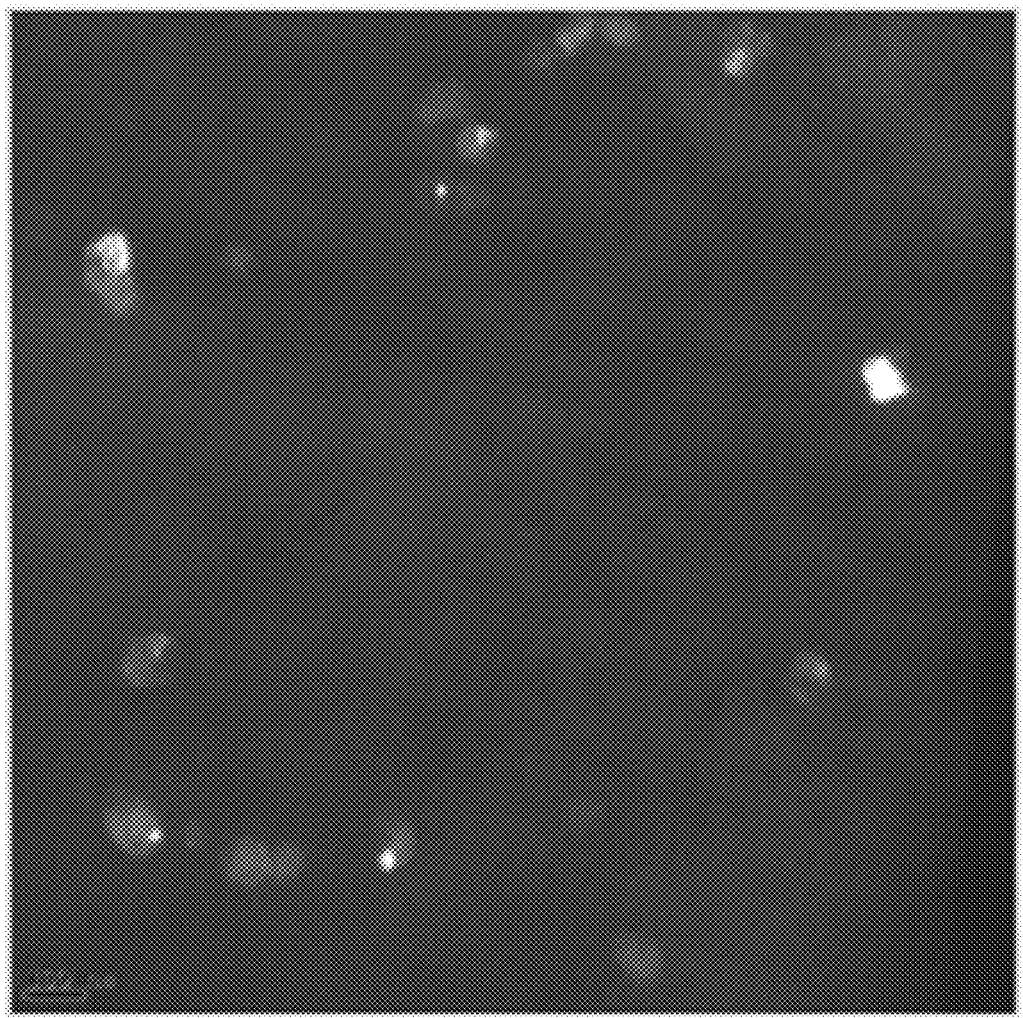
(d)
FIG. 4.7d

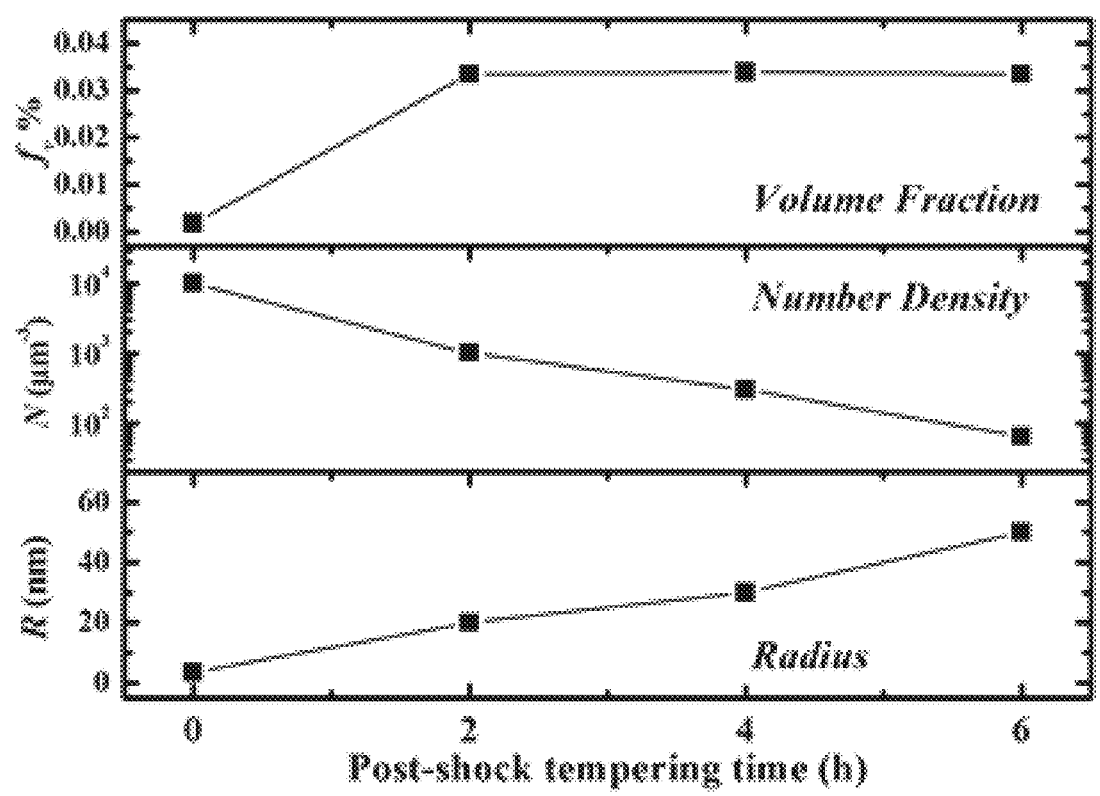
FIG. 4.8

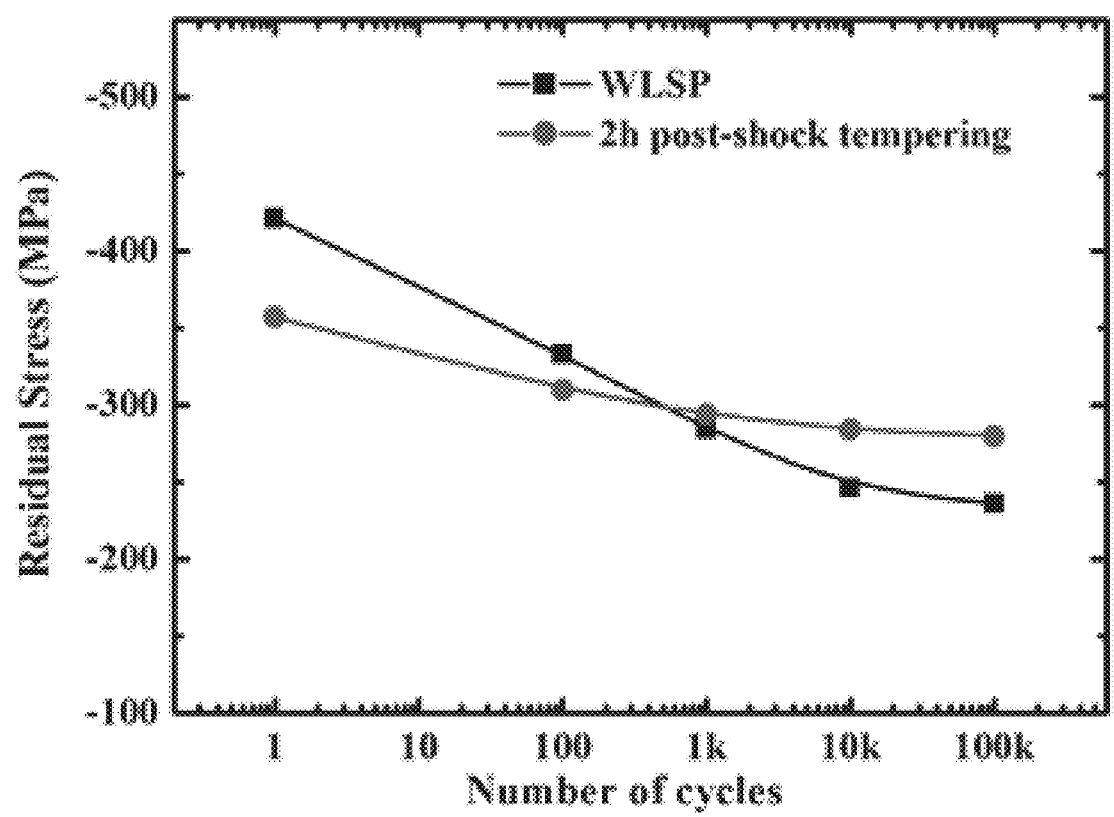
FIG. 4.9

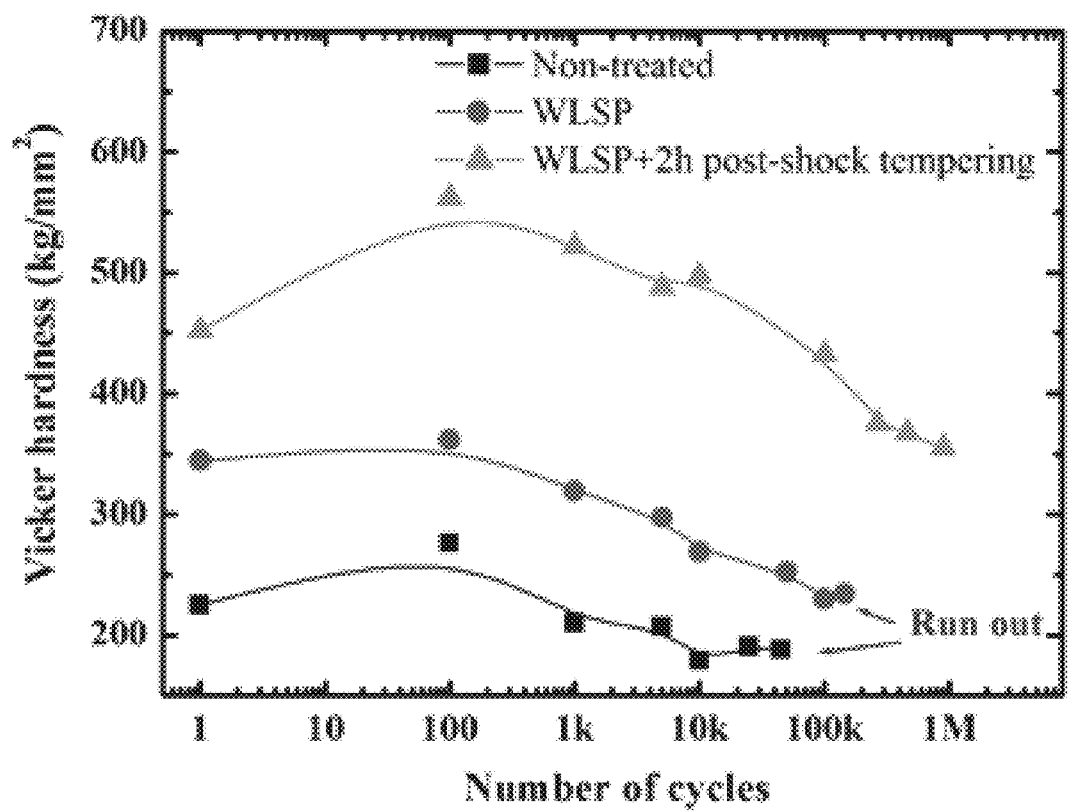
FIG.4.10

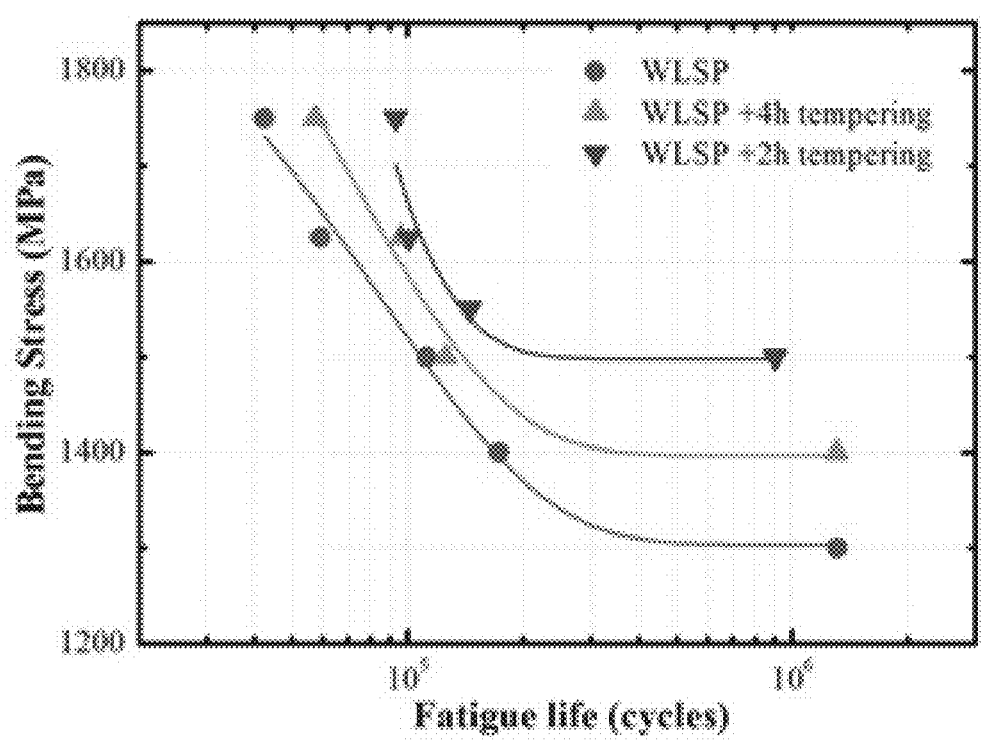
FIG. 4.11

LASER SHOCK PEENING APPARATUSES AND METHODS

This application claims the benefit of U.S. Provisional Application Nos. 61/587,815, filed Jan. 18, 2012, and 61/653,050, filed May 30, 2012, the entireties of which are hereby incorporated herein by reference.

FIELD

Embodiments of this disclosure relate generally to changing the surface structure and/or properties of a material, and more particularly to shock peening.

Alternate embodiments of the present disclosure relate to material surface processing techniques via high power energy pulsed laser shock peening, and more particularly to methods for enhancing the material surface strength, improving the cyclic and thermal stability of microstructures, and extending material's fatigue performance by introducing dynamic precipitation and dynamic strain aging effects through thermal-mechanical treatments.

BACKGROUND

Conventional material surface processing techniques, such as laser shock peening (LSP), shot peening (SP) and deep rolling (DR), can be used to improve fatigue performance of metallic components by generating a near-surface work hardened layer and introducing near-surface compressive residual stresses, which retards fatigue-crack initiation and propagation.

Laser shock peening (LSP) is a process that utilizes a high energy pulse laser to induce helpful compressive residual stress and work hardening surface layer to a component that results in improved component fatigue performance and corrosion resistance. A high energy pulse laser can be used to penetrate through the confinement media (water or glass) and shoot onto an ablative coating material (in some embodiments, a metallic thin foil), which vaporizes into a high pressure plasma. The expansion of the plasma generates shock wave propagation into the target component and plastically deform the component, which generates compressive residual stress and work hardening in the component surface.

SUMMARY

Known deformation processing techniques can improve material strength by work hardening and grain refinement. However, some of these processes inevitably lead to loss of material ductility. Efforts have been made to improve material strength without severe loss of material ductility. However, some of these methods are not suitable for bulk material and/or not applicable for industrial manufacturing.

As a severe plastic deformation processing, LSP has limitations. For example, the defect density accumulated during LSP can reach saturation quickly and this can limit the material strength improvement through LSP. By plastic deformation at the cryogenic temperature, dynamic recovery of dislocations can be suppressed and the saturation dislocation density increased. In this way, the material strength can be further improved.

Still further, known fatigue strengthening mechanisms do not always remain stable in the presence of cyclic and/or thermal loading. It was discovered that work-hardening and residual stress generated by conventional surface processing techniques can be reduced significantly during cyclic loading, particularly at high testing temperature due to the rearrangement and recovery of microstructures. In this way, the effect of fatigue life improvement by LSP, SP and DR was limited. Therefore, it was realized that there was a need for better fatigue performance, which could be realized by stabilizing the microstructures after processing.

Embodiments of the present disclosure provide an improved laser shock peening apparatuses and methods.

Embodiments of the present disclosure provide apparatuses and methods that perform laser shock peening while maintaining the material being processed at temperatures that are moderately elevated above room temperature and below the melting or recrystallization temperature of the material being processed.

Embodiments of the present disclosure provide apparatuses and methods that perform laser shock peening while maintaining the material being processed at temperatures that are moderately elevated above room temperature and below the recrystallization temperature of the material being processed and generate high dense nano-precipitation for better mechanical performance, such as fatigue life.

Embodiments of the present disclosure provide apparatuses and methods that perform laser shock peening at cryogenic temperatures.

One object of embodiments of the present disclosure is to design a hybrid surface processing technique that integrates laser shock peening and cryogenic plastic deformation for improved material properties.

An object of alternate embodiments of the present disclosure is to design a hybrid surface processing technique that perform laser shock peening at cryogenic temperature to generate deformation twinning and stacking fault for improved mechanical properties.

Embodiments of the present disclosure provide apparatuses and methods that perform laser shock peening while covering the surface of the material being processed with an active agent that enhances the pressure exerted on the surface.

Objectives of embodiments of the present disclosure include LSP apparatuses and processes that improve material properties, including, strength, ductility and fatigue resistance.

Embodiments of the present disclosure improve upon and resolve the stability problem of current surface processing techniques.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein is not necessarily intended to address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example, and not to be construed as limiting.

FIG. 1.1—The comparison of surface hardness and plastic deformation depth after LSP in $H_2O_2$ and water according to one embodiment of the present disclosure.

FIG. 1.2—Schematic illustration of fast chemical etching-assisted pulsed laser ablation according to one embodiment of the present disclosure.

FIG. 1.3—Mechanism of fast chemical etching-assisted pulsed laser ablation according to one embodiment of the present disclosure.

FIG. 1.4—Ablation depth and volume of PLA with $H_2O_2$ and $H_2O$ confinements according to one embodiment of the present disclosure.

FIG. 2.1—Schematic representation of a CLSP apparatus according to one embodiment of the present disclosure. A laser machine is used to deliver the pulsed laser. Optical mirrors (three in the illustrated embodiment) are optionally used to direct the laser beam. A focus lens can be used to focus the laser beam to desired beam size. A fixture is typically used to fix the target component. The fixture may be placed in a tank (e.g., a stainless steel tank) which can contain a low temperature liquid.

FIG. 2.2a—Side view of the CLSP fixture of FIG. 2.1.

FIG. 2.2b—Top view of the CLSP fixture of FIG. 2.1.

FIG. 2.3—Schematic representation of a gradient nano-structure generated by CLSP according to one embodiment of the present disclosure.

FIG. 2.4—TEM image of the deformation twins in stainless steel 304 generated by CLSP according to one embodiment of the present disclosure.

FIG. 3.1—Schematic of a laser beam delivery and focusing system in accordance with one embodiment of the present invention.

FIG. 3.2—Schematic of experimental set up and methodology of WLSP according to one embodiment of the present disclosure.

FIG. 3.3—Heating methods for WLSP experimental set up: (A) laser heating; (B) hot gas heating; (C) electric heating; (D) induction heating according to alternate embodiments of the present disclosure.

FIG. 3.4—TEM images of microstructures (including highly dense nano-precipitate, and dislocation/precipitate entanglement) in aluminum alloy 6061 after WLSP according to one embodiment of the present disclosure.

FIG. 3.5—Extension of fatigue performance of AISI 4140 steel after WLSP (comparing with LSP and non-treated samples) according to one embodiment of the present disclosure.

FIG. 3.6—The stability of surface hardness during cyclic loading at 1400 MPa maximal bending stress of non treated, WLSP and 2 h post-shock tempered samples according to one embodiment of the present disclosure.

FIG. 3.7—Residual stress relaxation during cyclic loading at 1400 MPa maximal bending stress of WLSP and 2 h post-shock tempered samples according to one embodiment of the present disclosure.

FIG. 3.8—S—N curves of WLSP and post-shock tempered samples according to one embodiment of the present disclosure.

FIG. 4.1—Surface hardness after WLSP at various laser power intensity and the corresponding peak plasma pressure according to one embodiment of the present disclosure.

FIG. 4.2—Surface hardness affected by pre- and post-shock tempering at various tempering time (laser intensity 3 $GW/cm^2$, tempering temperature 450° C.) according to one embodiment of the present disclosure.

FIG. 4.3—Surface hardness affected by the post-shock tempering temperature at various tempering time (laser intensity 3 $GW/cm^2$) according to one embodiment of the present disclosure.

FIG. 4.4—TEM images show the initial microstructures of quenched 4140 steel without peening according to one embodiment of the present disclosure.

FIG. 4.5—Microstructures in 4140 Steel after WLSP: weak beam dark field images (a and b) and related diffraction pattern of two beam condition (c) showing the entanglement of dislocations and the spherical-shaped nano-precipitates (pointed out by arrows) according to at least one embodiment of the present disclosure.

FIG. 4.6—Microstructures of WLSP+2 h post-shock tempered sample: (a) bright field TEM image showing dislocation structures; (b) diffraction pattern with weak spots (circled and indicated by the ring) associated with precipitate structures; (c and d) dark field TEM images at different magnification showing precipitate structures according to at least one embodiment of the present disclosure.

FIG. 4.7—Microstructures in WLSP+6 h post-tempered sample: (a and b) bright field TEM images with different magnification showing dislocation walls (indicated by arrows) and precipitates with a relatively large size (circled by rings) are formed and tangled with each other; dark field images showing precipitates at top surface (c) and a deeper region (d) by selecting the weak spot (circled by the ring) from the inserted diffraction pattern according to at least one embodiment of the present disclosure.

FIG. 4.8—The evolution of precipitate radius, number density and volume fraction with the post-shock tempering time according to one embodiment of the present disclosure.

FIG. 4.9—Residual stress relaxation during cyclic loading at 1400 MPa maximal bending stress of WLSP and 2 h post-shock tempered samples. (The error bar for the residual stress measurements is 20 MPa) according to one embodiment of the present disclosure.

FIG. 4.10—The stability of surface hardness during cyclic loading at 1400 MPa maximal bending stress of non treated, WLSP and 2 h post-shock tempered samples. The error bar for the hardness test is 10VHN according to one embodiment of the present disclosure.

FIG. 4.11—S—N curves of WLSP and post-shock tempered samples according to one embodiment of the present disclosure.

DETAILED DESCRIPTION OF THE ILLUSTRATED EMBODIMENTS

For the purposes of promoting an understanding of the principles of the disclosure, reference will now be made to one or more embodiments illustrated in the drawings and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to "advantages" provided by some embodiments, other embodiments may not include those same advantages, or may include different advantages. Any advantages described herein are not to be construed as limiting to any of the claims.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

Enhanced Laser Shock with Active Liquid Confinement (e.g., Hydrogen Peroxide)

Embodiments of the present disclosure include apparatuses and processes to generate an enhanced laser shock with a higher pressure by utilizing active liquid confinement—hydrogen peroxide ($H_2O_2$). A mechanism of fast chemical etching-assisted laser ablation is also presented. As a result, the efficiency of underwater laser shock peening of aluminum alloy 6061 is improved by 150%, and the ablation rate of pulse laser ablation of zinc is enhanced by 300%. These methods break a major limitation of underwater pulsed laser processing caused by the generation of breakdown plasma.

The laser shock induced by pulse laser ablation under a confinement has potential for industrial applications, such as laser shock peening (LSP), laser dynamic forming (LDF) and laser-assisted micromachining. The capability, efficiency and application range of these laser-based techniques are generally determined by the intensity of laser shock. The intensity of the laser shock is generally determined by not only the laser power but also the confining media. The selection of confining media can bring a major limitation to determining the intensity of the laser shock. For example, solid confinements like glass are inconvenient for processing 3 dimensional surfaces, and they are also too brittle to stand a high powered laser pulse. On the other hand, even if the liquid confinements like water are relatively more flexible and practical, they can still suffer from drawbacks, such as: when the laser intensity is above a threshold, the breakdown of liquid confinements screens the incident laser power and results in a saturation of laser shock and peak pressure.

Embodiments of the present disclosure include processes and methods to enhance the intensity of laser shock by applying active liquid confinements like $H_2O_2$ and other similar compounds. The material to be hardened is covered in an active agent (e.g., $H_2O_2$). The active agent interacts with the laser energy and enhances the shock peening process. The laser shock is dependent on the high density of laser-induced plasma, which is determined by the ablation rate of target materials through laser/material interactions. Thus, the intensity of the laser shock can be enhanced by using active liquid confinements because of the more effective ablation caused by the fast chemical etching reaction taking place simultaneously during the laser ablation process. Experimental results reflect that the surface hardness and plastic deformation depth of aluminum alloy 6061 (AA6061) after LSP are effectively increased by using $H_2O_2$ as the confinement instead of $H_2O$. LSP efficiency is improved by 150% with the application of $H_2O_2$. The mechanism described suggests that the enhanced intensity of laser shock produced by $H_2O_2$ may be due to the higher ablation rate caused by the mutual promotion between the laser ablation and chemical etching. This mechanism has been further verified by experiment results of pulse laser ablation (PLA) of zinc, which reveals that $H_2O_2$ could dramatically increase the ablation rate by almost 300%. The enhanced laser shock can provide a great potential in many laser applications.

To verify the enhancement of laser shock by active confinements, LSP of AA6061 was performed with $H_2O_2$ as the confinement and aluminum foil as the ablator, and compared with underwater LSP. $H_2O_2$ was employed as the active liquid confinement in this study. $H_2O_2$ has a strong oxidbillity, low price, and can be applied in industrial applications. A Surelite III Q-switched Nd-YAG laser (Continuum Inc.), operating at a wavelength of 1064 nanometer with a pulse width (full width at half maximum (FWHM)) of 5 nanoseconds was used to deliver laser pulses. The micro-hardness of samples after peening was measured by a Leco micro-hardness test machine with 25 g load and 10s holding time. The surface profile after processing was characterized by a Wyko NT3300 HD surface profiler from Veeco Inc.

$$\varepsilon_p = \frac{2HEL}{3\lambda + 2\mu}\left(\frac{P}{HEL} - 1\right) \quad \text{1a)}$$

$$HEL = \frac{\lambda + 2\mu}{2\mu}\sigma_Y^{dyn} \quad \text{1b)}$$

$$\lambda = \frac{Ev}{(1+v)(1-2v)}, \mu = \frac{E}{2(1+v)} \quad \text{1c)}$$

The surface hardness and surface plastic deformation depth after LSP confined by $H_2O_2$ and water were measured and compared to evaluate the pressure effect caused by the enhanced laser shock, since the laser shock pressure is relatively difficult to be directly measured. In LSP process, the surface plastic strain, $\varepsilon_p$, depends on the peak pressure of laser shock could be expressed by Eq. 1, where P is the peak pressure, HEL is the Hugoniot elastic limit, $\sigma_Y^{dyn}$ is the dynamic yield strength, $\lambda$ and $\mu$ are the Lame's constants in terms of Young's modulus E and Poisson's ratio v. The higher surface strain induced by the enhanced laser shock pressure brings a stronger strain hardening effect, and results in a greater value of surface hardness. On the other hand, the plastic strain induced by laser shock pressure is a decreasing function of the surface depth. The plastic deformation occurs to the depth where the peak stress no longer exceeds HEL and $\varepsilon_p=0$. Therefore, the enhanced laser shock pressure could be characterized by the surface hardness and plastic deformation depth after LSP.

Experiment results of under liquid LSP are presented in FIG. 1.1, and each data point is the average of five measurements. It was determined that LSP under $H_2O_2$ resulted in a greater surface hardness than underwater LSP (FIG. 1.1A). For instance, with the same laser intensity 8 GW/cm$^2$, the hardness was increased from 113 VHN (Vickers hardness number) to 123 VHN by applying $H_2O_2$. Considering that the hardness of AA6061 before LSP is around 94VHN, $H_2O_2$ increases the efficiency of underwater LSP by 153%. In addition, it is also found that even if the laser intensity of underwater LSP is enhanced from 4 GW/cm² to 12 GW/cm², the hardness is increased by 9% from 108VHN to 118VHN. This is likely because while the laser intensity is over 10 GW/cm², the breakdown plasma is generated, and results in the saturation of peak pressure. On the other hand, replacing $H_2O$ by $H_2O_2$ can break this limitation and enhance the hardness up to around 132VHN, which is close to the saturated hardness value of AA6061 caused by the strain hardening.

Meanwhile, $H_2O_2$ brings a relatively larger surface deformation depth as well (FIG. 1.1B). For example, with the same laser intensity 10 GW/cm², $H_2O_2$ increased the deformation depth by 153.4% from 0.73 µm to 1.12 µm. Furthermore, the same saturation phenomenon of laser shock was observed for underwater LSP, and $H_2O_2$ is believed to effectively break this limitation by forming a deeper surface dent. Therefore, both surface hardness and deformation depth after LSP suggest that the enhanced laser shock with a greater pressure is generated by applying $H_2O_2$ as the confining media.

The intensity of laser shock is likely introduced and governed by the expansion of the laser-induced plasma, while the plasma parameters including density, pressure and temperature are ruled over by the ablation rate. Therefore, it is believed that the greater ablation rate promoted by active confinements may play a role in this process to enhance the laser shock with a higher pressure.

To help understand this process, the mechanism of fast chemical etching-assisted PLA was applied, which is schematically illustrated in FIG. 1.2. The flow chart of this mechanism is presented in FIG. 1.3, and the ionization and chemical etching reactions taking place during the process are summarized as Eq. 2-6 (see FIG. 1.3), where hv stands for the photon energy, and $\Delta E_T$ is the thermal energy released by etching reactions. When the surface of metal target at the focal spot is vaporized and ionized by the front part of incident laser pulses, a laser-induced plasma plume is created at the target/confinement interface (FIG. 1.2A). This ionization is governed by the inverse-bremsstrahlung mechanism (Eq. 2, see FIG. 1.3) related to the fast growth of free electrons e⁻. Once generated, the plasma is immediately forced into a thermodynamic state due to the confining effect of the liquid confinement. Meanwhile, a dramatic increase of the plasma pressure and temperature is induced by absorbing the later part of laser energy, followed by the formation of a shockwave with a supersonic velocity at the interface. Many reports have already demonstrated that the pressure of the laser-induced plasma under liquid confinements is at the level of GPa, and the temperature could attain several thousand K. This environment provides for the decomposition reaction of $H_2O_2$, which releases the atomic oxygen O⁻ as a strong oxidizer for the chemical etching process (Eq. 3). (Note that the byproduct of this process using hydrogen peroxide as the active agent is water, which is easily disposed of, recycled, or reprocessed back to hydrogen peroxide). Noting here, the high temperature could accelerate the chemical decomposition rate. The decomposition rate of $H_2O_2$ within a high temperature environment (higher than 10³K) can reach the order of magnitude of 10⁷ cm³ mol⁻¹ s⁻¹. In addition, considering the powerful condensation effect of liquid confinements, it is reasonable to indicate that the decomposition reaction occurs at the surface region of the plasma plume and the released atomic oxygen is confined and exists at the interface as illustrated in FIG. 1.2B. Furthermore, some released atomic oxygen could be further ionized by absorbing the later laser energy to form ionized oxygen O⁺ with an even stronger oxidbillity due to the inverse-bremsstrahlung process (Eq. 4, see FIG. 1.3). Thus, the fast chemical decomposition rate and small confining volume could cause the formation of a plasma thin layer of atomic and ionized oxygen with a strong oxidbillity and high concentration, resulting in a fast chemical etching process to remove more target materials (Eq. 5, 6, see FIG. 1.3).

The mutual promotion of the greater ablation rate and enhanced plasma results in a further increase of ablation rate, and thus the laser shock pressure. The higher plasma pressure results in a higher ablation rate. According to the discussion above, the enhanced plasma with a higher internal energy and pressure is expected due to the following reasons. First of all, the chemical etching process increases the plasma density and thickness by removing more target materials, resulting in an increase of plasma pressure. The total pressure of plasma P is the sum of the electron partial pressure $P_e$ and the particle partial pressure $P_p$ as illustrated by Eq. 7, where $k_B$ is the Boltzmann constant, $n_e$ and $n_p$ are the amount of electron and particle relatively. Therefore, increasing electron and particle density $n_e$ and $n_p$ by chemical etching reactions could strengthen the plasma pressure. Furthermore, based on Fabbro's model, the time evolution of the plasma pressure P(t) and thickness L(t) is presented in Eq. 8, where $Z_1$ and $Z_2$ are the shock impedances of target and confining media. It is demonstrated the plasma pressure is proportional to the plasma thickness. The greater plasma thickness is expected, since the greater ablation rate could cause a deeper ablation depth. Secondly, the plasma parameters could be further affected by the thermal energy released from chemical etching process (Eq. 5, 6). This thermal energy will be applied to increase the plasma internal thermal energy and open the liquid/target interface. The energy balance during processing could be described by Eq. 9, where I, $E_T$, and α are the laser intensity, thermal energy absorbed by plasma, and a constant fraction respectively. Eq. 9 shows that increase of released thermal energy $\Delta E_T$ could cause a higher plasma pressure. Thus, the ablation rate and plasma pressure reciprocally promote each other, and result in an enhanced laser shock.

$$P = P_e + P_p = k_B T_e n_e + k_B T_p n_p \quad 7)$$

$$\frac{dL(t)}{dt} = \frac{2P(t)}{Z}, \quad 2/Z = 1/Z_1 + 1/Z_2 \quad 8)$$

$$\frac{d(\Delta E_T)}{dt} + I(t) = P(t)\frac{dL}{dt} + \frac{d[E_T(t)L]}{\alpha dt} = P(t)\frac{dL}{dt} + \frac{3}{2a}\frac{d[P(t)L(t)]}{dt} \quad 9)$$

To verify the mechanism that enhanced laser shock is caused by the greater ablation rate induced by active confinements, PLA of Zinc was carried out with $H_2O_2$ as a confinement medium and compared with PLA of Zinc being carried out with $H_2O$ as a confinement medium. The increase of ablation volume by the active confinement $H_2O_2$ is demonstrated in FIG. 1.4. The cross-sectional profiles of the ablated area after PLA are shown in FIG. 1.4A, and an image of ablated area taken by the profiler is inserted at the lower left corner. To make the differences measurable and reduce the error introduced by the laser pulse variance, each profile was obtained with about 5 pulses PLA with a laser fluence of about 30 J/cm². It is observed that the maximum depth at the center of the ablated area was dramatically increased by approximately 200% from about 3 µm to about 9 µm while applying $H_2O_2$ as the confinement instead of $H_2O$. This is evidence of increased plasma thickness in the mechanism. In addition, the ablation diameter (R and R')

was enhanced by about 16% from about 0.32 mm to about 0.37 mm as well. This indicates the formation of the plasma thin layer of atomic and ionized oxygen as discussed above. The ablation volume $V_A$ was also compared to the ablation rate. FIG. 1.4B illustrates the increase of ablation volume by $H_2O_2$, and each data point is the average of 5 measurements. For instance, with 5 pulses ablation at a laser fluence of 60 $J/cm^2$, the ablation volume was dramatically enhanced by about 301% from about 3.39E-6 $mm^3$ to about 1.36 E-5 $mm^3$; with 10 pulses, the ablation volume was enhanced by about 321% from about 1.05E-5 $mm^3$ to about 4.42E-5 $mm^3$. Furthermore, it was also found that when using water as the confinement, even if the laser fluence is increased from 30 $J/cm^2$ to 60 $J/cm^2$, the ablation volume was slightly affected, such as enhanced by about 25.9% from about 8.34E-6 $mm^3$ to about 1.05E-5 $mm^3$ with 10 pulses ablation. This may be explained by the generation of breakdown plasma, which screens the laser pulse from reaching the target. However, with the same laser fluence about 30 $J/cm^2$ of 10 pulses ablation, and replacing $H_2O$ by $H_2O_2$ as the confinement, can dramatically enhance the ablation volume by about 143.4% from about 8.34E-6 $mm^3$ to about 2.03E-5 $mm^3$. Applying active confinement has a much higher efficiency on enhancing ablation rate than increasing laser power. This benefit can be broadly applied in pulsed laser processing, such as saving laser power and enhancing working efficiency in laser micromachining, and increasing the productivity in laser-assisted nanocrystal synthesis.

This work presents new apparatuses and processes to generate the enhanced laser shock with a higher pressure by applying $H_2O_2$ and other similar compounds as an active liquid confinement. The mechanism of fast chemical etching-assisted laser ablation is now possible using enhanced laser shock produced by $H_2O_2$ as a confinement medium. The greater ablation rate induced by the mutual promotion between ablation and etching processes is believed as the key factors for the enhanced laser shock. As a result, this method breaks a current limitation in underwater pulsed laser processing caused by the generation of breakdown plasma, and effectively improves the efficiencies of underwater LSP and PLA by about 150% and about 300%, respectively. Thus, the enhanced laser shock by active confinement can extend the applications of pulsed laser processing, such as LSP, laser-assisted micromachining, and under liquid PLA.

Cryogenic Laser Shock Peening

Hybrid surface processing methods and apparatuses integrating laser shock peening (LSP) and cryogenic plastic deformation is described according to various embodiments of the present disclosure. By submerging the target component into a low temperature liquid during LSP, helpful microstructure change can be induced in the target component. By manipulating the processing parameters, gradient nanostructure can be generated in material for best combination of material strength and ductility.

Cryogenic laser shock peening can complement traditional laser shock peening process for improved material properties including strength, ductility and fatigue performance. As an example, cryogenic laser shock peening can induce helpful microstructure change, including higher defect density, gradient microstructure, etc., in metallic components for enhanced material properties.

Cryogenic laser shock peening (CLSP) systems and methods according to embodiments of the present disclosure include methods and fixtures to impose low temperature to the target component. During the CLSP process, the target sample was kept at the cryogenic temperature by different methods. The temperature was controlled with a cryogenic thermal platform, such as a cold plate (temperature variable) or a cold liquid tank (temperature fixed). The sample temperature can be manipulated by submerging the target samples into the tank. The tank temperature could be changed by utilizing different cold liquids such as liquid nitrogen, liquid helium, liquid CO2, water-ice mixture, etc. Adhesive paints or aluminum foils can be used as the ablative coating materials protecting the samples from surface melting by the pulsed laser. For samples with flat surface, glass can be used as confinement media. Samples with curved surface will be submerged at least partly into the liquid bath. In this setup, the cold liquid serves as the cooling media as well as the confinement media. First, the cold liquid cools the samples to the boiling temperature of the cold liquid. Secondly, the cold liquid servers as the confinement media, similar to under water laser shock peening. Cryogenic systems have been used in industry for purposes such as cryogenic machining, cryogenic rolling, and cryogenic equal channel angular extrusion. In one embodiment to utilize CLSP in the industry, the tank can be replaced by a nozzle, which will spray cold liquid to cover the target sample both to cool the sample and to serve as confinement media.

The low temperature during CLSP effectively suppress dynamic recovery during the CLSP process and thus significantly improves material strength. The other effect of CLSP is the generation of highly dense nanomaterials (for example, nano-twins) at material subsurface as illustrated in FIG. 2.4. It has been reported that nanomaterials, such as nano-twins, can effectively block dislocation movement like grain boundaries and improve material strength.

In addition, CLSP can generate gradient nanostructure for a useful combination of strength and ductility. By controlling the parameters, such as the laser intensity, laser beam size, peening overlap ratio, the distribution and range of the gradient nanostructure can be controlled for different materials for a useful combination of material performance.

The optimal temperature at which the target material is maintained for CLSP varies with the properties of the target materials. The optimal temperature will generally maximize the mechanical twining, stacking fault in metals and/or martensite in steel. Methods to find out the optimal temperature range of CLSP for metals, including copper alloy, steel, and NiTi alloy were discovered. For many materials, the optimal temperature is from approximately 50 deg. K to approximately 250 deg. K. In general, the flow stress should be higher than the critical twinning stress in order to generate deformation twinning. CLSP can generate high volume fraction of martensite, high density stacking faults, and high density deformation twins resulting in higher material hardness and better fatigue performance than other forms of LSP.

FIG. 2.1 depicts a cryogenic laser shock peening method and apparatus according to one example embodiment. A high energy pulsed laser was delivered by a laser machine. Three optical mirrors were used to direct the laser beam, although alternate embodiments include a different number of mirrors or no mirrors. A focus lens was optionally used to focus the laser beam. The confinement media, the ablative coating material and the target component were clamped together by a fixture. A side-view of the fixture was shown in FIG. 2.2a. The target component was optionally on top of the fixture. On top of the target component was the ablative coating material (a metal foil with thickness around 30 to 200 μm). On top of the coating material was the confinement media (glass or other transparent solid material). Fasteners (e.g. four screws) were optionally used to clamp the confinement media, the ablative coating material and the target component to the fixture. FIG. 2.2b shows the top-view of the fixture.

During peening, a high energy pulsed laser penetrated through the confinement media and shot onto the ablative coating material. A portion of the ablative material was vaporized and generated high temperature plasma. The expansion of the plasma generated shock wave propagation into both the confinement media and the target component. This generated plastic deformation and helpful compressive residual stress in component surface. During the process, the component was cooled by, for example, being submerged in low temperature liquid. This liquid was optionally stored in a stainless tank. Depending on the low temperature, different liquid, such as liquid helium, liquid nitrogen ($LN_2$), liquid carbon dioxide, could be used. The low temperature of the component effectively suppressed dynamic recovery during plastic deformation and thus lead to high defect density in the material. In addition, the low temperature could effectively increase the density of deformation twins generated in various metallic materials (copper and its alloys, Iron, carbon steel, stainless, titanium and its alloys, etc.). Like grain boundaries, these deformation twins effectively blocked dislocation movement and thus hardens the materials. In addition, the deformation twins had good thermal stability and lead to good thermal stability of the microstructure after CLSP. Furthermore, CLSP generated higher volume fraction of martensite transformation than at room temperature LSP and thus further strengthen the material.

One feature of the CLSP process was the generation of gradient nanostructure. As shown in FIG. 2.3, after peening both sizes of a target component, gradient microstructures were generated. In the top surface, where some severe plastic deformation occurs, nano-crystallization occurred. The nano-crystalline surface had high strength and was effective to inhibit crack formation. At material subsurface, some plastic deformation took place and the grains were refined to a certain extent. In this layer, the microstructure was characterized by refined grain with dislocations and deformation twins embedded in the grains. The interaction between the dislocation and deformation twins effectively strengthened the material and provided good thermal stability. Deeper into the material, the material was less affected by the peening process and the microstructure was characterized by coarse grains with relatively low density dislocations. Due to its low dislocation density and large grain size, the materials in this region had enough room for strain hardening (work hardening) and thus rendered good ductility of the component during tensile loading.

It was believed that CLSP could effectively induced gradient nanostructure in metallic components for improved material strength and ductility. It was noted that various changes or modifications were made to the process parameters to suit different requirement in real cases.

Embodiments include one or more of the following:
In the cryogenic laser shock peening process (CLSP), the target component is kept at the desired low temperature through a low temperature liquid bath during the peening process.
The low temperature can effectively suppress dynamic recovery and thus lead to high defect density, which further hardens the material.
The low temperature can induce the generation of highly dense deformation twins in various metallic materials (Cu and its alloy, iron, carbon steel, stainless steel, etc.). These deformation twins harden the material like the grain boundaries and have good thermal stability.
CLSP can induce higher volume fraction of martensite transformation than room temperature LSP and thus further strengthen the material.
CLSP can generate gradient nanostructure in metallic component, which leads to high material strength and ductility.

Warm Laser Shock Peening and Optional Heat Treatment

Embodiments of the present disclosure utilize warm laser shock peening and optional heat treatment, which can stabilize residual stresses, increased strength, and enhanced fatigue performance.

Further embodiments of the present disclosure include warm laser shock peening (WLSP), which can be a rapid and low cost thermal-mechanical material processing technique for enhancing the fatigue performance of metallic components and improving the cyclic and thermal stability of microstructures via high energy pulsed laser shock peening at elevated temperatures. During an example process, the laser energy was absorbed by the ablative coating materials placed on the surface of target material to generate laser-induced plasma. The hydrodynamic expansion of laser-induced plasma was confined by the presence of a transparent confinement, leading to the generation of high pressure shock waves that propagated into the target and resulted in a near-surface high strain rate plastic deformation. Meanwhile, a heating source was applied to elevate the temperature of target to a specified temperature or range of temperatures. The results from mechanical processing and thermal energy lead to the generation of highly dense nano-scale precipitates and uniformly distributed dislocation structures through dynamic precipitation (DP) and dynamic strain aging (DSA). As compared to conventional surface processing techniques (such as traditional LSP), WLSP effectively improved the fatigue performance of metallic components. The interaction between nano-precipitates and dislocations, also known as dislocation pinning effect, contributed to the fatigue improvement through the enhanced cyclic and thermal stability of microstructures. Warm laser shock peening (WLSP) and the following post-shock tempering treatment have been found to achieve optimized surface strength and fatigue performances of metallic materials. This improved material stability and reliability was attributed to the enhanced dislocation pinning effect corresponding with the number density, size and space distribution of nano-precipitates, which could be tailored by manipulating processing conditions of WLSP and post-shock tempering. The precipitation kinetics as well as dislocation pinning strength affected by precipitate parameters were analyzed. The heating methods, such as laser heating, electromagnetic heating, hot gas heating, or electric heating were feasible to heat the metal piece during the process. The temperature during laser shock peening was helpful to the final microstructure and mechanical properties. Optimal processing temperatures were discovered during WLSP. The post annealing temperature and time were also useful to control the microstructure for optimal mechanical properties (see appendix).

The optimal temperature will generally vary based on differences in the target material. The optimal temperature will maximize the density of nanoprecipitation by mechanism of dynamic strain aging and dynamic precipitation. Normally the optimal temperature is below the recrystallization temperature and higher than the room temperature. If temperature is too high, dislocation density will reduce and less amount of nucleation size for nanoprecipitation, ending up with coarse precipitates. If temperature is too low, the nucleation rate of the precipitation will be reduced, ending up with very small amount of nanoprecipitates.

Referring to the example embodiment depicted in FIG. 3.1, a Q-Switched Nd-YAG laser was used to deliver the laser pulse. The laser wavelength was adjusted as 1064/532/355 nm dependent on the absorption of the ablative coating. A suitable laser system of an energy output in the range of several to several hundred J/pulse with a pulse duration of optionally less than 100 ns was used. A focus lens was optionally applied to focus the laser beam on the surface of target to a certain size. An optional motorized X-Y stage was placed at the bottom of target to manipulate the laser scanning speed and laser processing positions. The laser scanning speed was accurately determined by considering the laser frequency and beam size plus the laser beam overlap ratio.

FIG. 3.2 depicts a schematic of an example experimental set up and methodology of WLSP according to at least one embodiment. During WLSP, a laser pulse penetrated through the confining media and irradiated the ablative coating material. With the absorption of the laser energy, the ablative coating material at the focal spot was vaporized and ionized, resulting in the formation of laser-induced plasma plume. The expansion of plasma, which was optionally confined by the presence of confining media, led to the shock wave propagation into the target material and the optional confining media. When the shock wave pressure exceed the Hugoniot elastic limit of target material, plastic deformation occurs, accompanied by the generation of near-surface work hardening layer and compressive residual stress. Besides the plastic deformation, the thermal energy provided by the heating sources during WLSP played another useful role. The combined effects of mechanical deformation and thermal heating lead to the generation of highly dense nano-precipitates in target materials through dynamic precipitation process. The elastic interaction between nano-precipitates and nearby mobile dislocations, so called dislocation pinning effect, stabilized the microstructures during cyclic and/or thermal loading, and resulted in improved fatigue performance.

The optional confining media of WLSP can generally be any transparent material, such as glass, water, fused quartz and silicone oil. Note that for the industrial applications of WLSP, the silicone oil with a flash point over 600° F. is generally more practical as a confining media than the glass and water, since the glass could have be shattered by the laser-induced shock pressure, and the vapor point of water was too low.

The ablative coating materials (metallic foils, organic paints or adhesives) were used for the absorption of laser energy and also assisted the surface of target material from melting, ionizing and damaging by laser pulse.

The laser power intensity was one helpful laser parameter in WLSP process, since it was related to the shockwave peak pressure that governed the magnitude and depth of compressive residual stress. The plastic deformation occurred when the shock wave pressure exceed the Hugoniot elastic limit of target material. With the increase of laser power intensity, residual stresses increase with depth but decrease at the surface because of surface release waves. Additionally, the dislocation density, which strongly affects the nucleation process through dynamic precipitation, reached a saturation point associated with a certain magnitude of shockwave peak pressure. The above factors indicate that there were optimal WLSP conditions in terms of laser power intensity. The laser power intensity was affected and could be adjusted by several other laser parameters including laser pulse duration, laser beam size, pulse energy, etc.

Besides laser power intensity, the WLSP processing temperature played another useful role, and was accurately manipulated. When the processing temperature was lower than the optimal one, the dynamic precipitation effect was less effective, resulting in a weaker dislocation pinning strength and thus a worse fatigue performance. On the other hand, when the processing temperature was too high, the thermal-induced dynamic recovery occurred, leading to a softening effect on the surface strength.

The resulting microstructures and stress/strain distribution after WLSP were strongly affected by the above two processing parameters: laser power intensity and processing temperature. Greater laser power intensity led to a higher strain rate plastic deformation by generating a stronger shockwave peak pressure, which governed the magnitude and depth of resulted compressive residual stresses. The relationship between laser power intensity $I_0$ and peak pressure P was expressed by Fabbro's model as $$P(I_0) = 0.10\left(\frac{\alpha}{2\alpha+3}\right)^{1/2} Z^{1/2} I_0^{1/2},$$

where $\alpha$ is the efficiency of the interaction. Z is the combined shock impedance defined as $Z=2/(1/Z_1+1/Z_2)$, where $Z_1$ and $Z_2$ were the shock impedance of the material and the confining media, respectively. Additionally, the strain hardening and dynamic strain aging effects were enhanced due to stronger laser intensity, leading to the formation of dislocation structures with a higher density. These dislocations interacted and tangled with each other to form the dislocation cores, which were accepted as the available nucleation sites where it was possible for the nucleation to take place. This was due to the dislocation core energy released for nucleation and the enhanced nucleation atoms' migration assisted by the dislocation inter-connections. The laser power intensity increased the nucleation rate of nano-precipitates by generating more available nucleation sites and providing dislocation core energy. On the other hand, the elevated processing temperature had a favorable influence on the nucleation rate during WLSP by providing thermal energy for nucleation reactions and also decreasing the chemical driving force for nucleation. The chemical driving force represented the excess free energy provided by the unstable phase relative to the stable phase. A precipitate was generally considered as the relatively stable phase with lower free energy before reaching the equilibrium temperature, and the excess free energy provided by the unstable phase (matrix material) was reduced by elevating the temperature. As one major component of nucleation activation energy, the chemical driving force decreased by the elevated temperature noticeably improve the efficiency of WLSP by increasing the nucleation rate.

FIG. 3.3 depicts the heating methods which can be used for WLSP, such as laser heating, hot gas heating, electric heating, and induction heating. For laser heating systems (FIG. 3.3A), the positions of sample surface subjected to laser peening process were simultaneously treated by another laser beam which provided laser energy to heat up the temperature of focal points. For hot gas heating systems (FIG. 3.3B), the hot gas with a certain temperature was generated by a hot gas generator and inputted into a gas chamber to elevate the target temperature. For the electric heating equipments such as electric heating plate (FIG.

3.3C), the equipment could be placed at the bottom of the target to elevate the target temperature by converting electrical energy to thermal energy. For induction heating systems (FIG. 3.3D), a power supply sends an AC current through an inductor (copper coil) to heat up the work piece placed inside the inductor.

The accurate measurement of residual stress was useful in the quality control of WLSP process. Several techniques could have been used to measure residual stress, including center-hole drilling, X-ray diffraction, layer removal, etc. The center-hole drilling method involves drilling a small hole into the sample, and using a residual stress gauge to measure the relieved surface strains. The X-ray diffraction technique uses the lattice spacing as the strain gauge to calculate the residual stress based on the changes in Bragg angle and inter-planar spacing. The layer removal method involves the removal of layers on one side of a flat plate, and the resulted curvatures dependent on the original stress distribution are measured for the residual stress deduction.

TEM images in FIG. 3.4 show the microstructures of aluminum alloy 6061 after WLSP. It was observed that the highly dense spherical-shaped nano-precipitates with a diameter around 6-10 nm were generated after processing (pointed out by arrows). The nucleation took place during WLSP was assisted by the thermal energy supplied by the warm temperature and the high strain rate plastic deformation provided by the laser shock pressure. As the high strain rate causing plastic deformation occurred, the highly dense dislocations were generated, which interacted and tangled within each other and with nano-precipitates. Consequently, highly dense and uniformly distributed dislocations were formed due to the particle/dislocation interaction.

FIG. 3.5 depicts the stress-lifespan (S—N) curves for bending fatigue testing of AISI 4140 steel after various processing conditions. The S—N curve moved to the right after LSP and WSLP. Under certain stress magnitudes (1200 and 1500 Map), the fatigue life after WLSP was 3-5 times higher than that after LSP. This notably indicated that WLSP improved fatigue performance more effectively than LSP. This was mainly resulted from the enhanced cyclic and thermal stability after WLSP due to the dislocation pinning effect.

FIG. 3.6 compares the residual stress relaxation during the cyclic loading at 1400 MPa maximal three-point bending stress of non-treated samples, samples treated with WLSP, and samples treated with WLSP followed by two hours of annealing (2 h post-shock tempered samples). Compared to WLSP samples, the initial residual stress before cyclic loading of 2 h post-shock tempered samples had a lower magnitude. This stress relaxation was mainly caused by the thermal-induced diffusional creep and dislocation glide during the tempering process. However, a more noticeable stress relaxation could be seen in WLSP samples with increasing cyclic loading numbers.

In WLSP samples, the cyclic residual stress relaxation was likely due to the micro-plastic strains accumulated from cycle to cycle, while in 2 h tempered samples, the presence of larger size precipitate effectively resisted material's plastic behaviors by locking mobile dislocations. In addition, the stress relaxation occurred when the superposition of the loading stress, residual stress and dislocation pinning stress exceeded a material's yield stress. Therefore, for 2 h tempered sample, with the same loading stress and a lower initial residual stress, the suppressed stress relaxation was attributed to the enhanced pinning stress. This improvement made a major contribution for a better fatigue performance.

The stability of surface strength was also useful for the effective fatigue improvements by determining the resistance to crack initiation. The surface hardness changed with the cyclic loading of samples processed by various conditions is shown in FIG. 3.7. It was of interest to notice that in the first 100 cycles, a helpful hardening effect was induced by cyclic loading in 2 h tempered samples, while no such phenomenon was observed in WLSP samples. Both WLSP and 2 h tempered samples contained the highly dense dislocations, but the precipitate size of 2 h tempered sample was 4 times larger than that of WLSP sample. Therefore, the cyclic hardening in 2 h tempered sample was explained by the enhanced pinning effect from the precipitate coarsening. The resulting larger particles exert a greater pinning force to resist the movement of dislocations during the cyclic loading. To continue the plastic behavior, the generation of more mobile dislocations was necessary, resulting in the enhanced dislocation multiplication. This contributed to a greater surface hardness. After 100 cycle loadings, a softening effect of surface hardness was observed with increasing cycle numbers in both WLSP and 2 h tempered samples. However, compared to the WLSP sample without additional hardening, the 2 h tempered sample had a lower softening rate, which indicated a higher cyclic stability of surface strength.

Three-point bending fatigue performances obtained after various processing conditions were demonstrated by the stress-lifespan (S—N) curves in FIG. 3.8. It was shown that compared to WLSP, a better fatigue performance was achieved by 2 h post-shock tempering treatment.

Thermal Engineered Laser Shock Peening

Embodiments of the present disclosure utilize thermal engineered laser shock peening, which can enhance fatigue performance.

Thermal engineered laser shock peening (LSP) according to embodiments of the present disclosure is a technique combining warm laser shock peening (WLSP) with the followed post-shock tempering treatment to achieve the optimized surface strength and fatigue performances of metallic materials. This technique integrates aspects of LSP, dynamic strain aging (DSA), dynamic precipitation (DP) and post shock tempering to obtain optimized microstructures for extending the fatigue life, such as nano-precipitates and highly dense dislocations. In this work, AISI 4140 steel was used to evaluate thermal engineered LSP process. The resulting microstructures as well as mechanical properties were studied under various processing conditions. The mechanism of fatigue performance improvements was investigated. It was found that the extended fatigue life was generally caused by the enhanced cyclic stability of compressive residual stress as well as surface strength. This improved material stability and reliability were attributed to the enhanced dislocation pinning effect corresponding with the number density, size and space distribution of nano-precipitates, which could be tailored by manipulating processing conditions of WLSP and post-shock tempering. Precipitation kinetics as well as dislocation pinning strength affected by precipitate parameters were analyzed.

Laser shock peening (LSP) is a surface processing technique used to extend the fatigue life of metallic materials. The near-surface compressive residual stresses as well as work-hardening states are characteristics produced after LSP, resulting in the high resistance to the crack initiation and propagation. These near-surface alterations make contributions for the improvement of fatigue performance. Due to the high strain rate deformation caused by the laser shock pressure (normally $10^5$~$10^7$/s), the magnitude and depth of compressive residual stresses as well as the strain-hardening ratio produced by LSP are generally greater than other plastic deformation processes such as shot peening and deep rolling. However, the compressive residual stress may not be stable during the cyclic loading, especially under the high testing temperature. The residual stress relaxation of laser shock peened steel AISI 304 was increased with increasing the temperature and cyclic loading number. The similar phenomenon was reported that both the annealing treatment and the cyclic loading lead to helpful relaxation of surface residual stress of steel 4140 processed by LSP. This stress relaxation related to the microstructure rearrangement can make LSP less effective for fatigue improvement.

Warm laser shock peening (WLSP) can increase the stability of microstructures. In some embodiments, WLSP is a thermal-mechanical processing technique, which integrates the aspects of LSP, dynamic strain aging (DSA), and dynamic precipitation (DP) to enhance fatigue performance. DSA was a strengthening mechanism caused by the interaction between the mobile dislocations and diffused solute atoms. This interaction could effectively enhance the dislocation multiplication, which lead to highly dense dislocations with a uniformly distributed arrangement. DP, also known as strain-induced precipitation, took place simultaneously during the deformation to generate highly dense nanoscale precipitates. The nucleation process during DP assisted and accelerated by the presence of highly dense dislocations from DSA. The number density of nano-precipitates generated by WLSP is in the order of magnitude of $10^4/\mu m^3$. These precipitates act as local barriers and interact elastically with nearby moving dislocations by exerting a pinning force to inhibit and resist dislocation movements. This precipitate/dislocation interaction, so-called the dislocation pinning effect, effectively contributed to the stabilized microstructures, which in turn improved the stability of surface strength and compressive residual stress and thus extends the fatigue life. For example, further improvements for the surface hardness of AISI 1042 steel was produced by WLSP relative to LSP. Compared to LSP, WLSP results in a better fatigue performance of 4140 steel due to the improved residual stress stability. However, the improved surface hardness of 1042 steel by WLSP relative to LSP was less than 10%; while the fatigue limit of 4140 steel after WLSP is increased by 75 MPa corresponding to 7%. Therefore, the efficiency of WLSP on mechanical performances was low, and the microstructures after WLSP was not optimized. It was useful to discover a new approach that further improved WLSP efficiency so as to obtain the optimal microstructures for mechanical applications.

From the point of view of dislocation pinning strength, the limitation of WLSP efficiency was generally attributed to the limited pinning strength due to the precipitate size (normally 5-10 nm in diameter). This was determined by the short DP time (in nanosecond level) associated with the laser pulse duration. Pinning strength is strongly affected by several precipitate parameters including the size, number density, inter-particle spacing, and volume fraction. To overcome the precipitate/dislocation interaction, a greater applied stress was needed for the metal matrix containing particles with a higher volume fraction, larger size and/or greater number density. The dislocation pinning effect induced by WLSP had been studied by multiscale discrete dislocation dynamic (MDDD) simulation. It was found that with the consideration of precipitate volume fraction, the optimal pinning strength was determined by balancing the particle size and number density effects. MDDD simulation results indicate the microstructures after WLSP are not necessarily optimized for mechanical performances, and have a potential to be further improved.

In order to obtain the optimal microstructures with the optimized pinning strength for mechanical applications, thermal engineered LSP was studied. This technique extended the precipitation kinetics from the nucleation stage to the coarsening stage by combining WLSP with the followed post-shock tempering treatment. Tempering was a heating process used to treat the quench-hardened steel for a combination of strength, ductility and structural stability. The coarsening of nano-precipitate during the post-shock tempering differs from the conventional static aging due to the presence of interconnected dislocation network from DSA, which could effectively assist and accelerate the solute diffusion. Cyclic loading induced the formation of precipitates in Al—Mg—Si materials due to the presence of highly dense dislocations. A numerical model was created to study the precipitation kinetic in Nb microalloyed steel by considering the heterogeneous nucleation on dislocations and the enhanced growth due to the pipe diffusion through the dislocation network. During thermal engineered LSP, the enhanced pinning effect was achieved by a short time tempering treatment after WLSP that provided the thermal energy and the aging time for the growth of precipitates. However, this dislocation-assisted coarsening of particles was mostly accompanied with a decrease of particle number density. The over-tempering effect weakened the pinning strength by decreasing the particle number density, and lead to the dislocation thermal glide and residual stress relaxation. As a result, the post-shock tempering treatment was investigated by carefully manipulating tempering time and temperature to control the balance between particle size and number density for an optimal pinning effect. In addition, thermal engineered LSP was studied for the optimal processing condition, since it was thought that this technique had a greater potential than other surface processing techniques (shot peening, deep rolling, LSP etc) to reach the optimal mechanical performances of metal materials due to: (1) the effective strain hardening effect and the high magnitude and in-depth compressive residual stress produced by the ultra high strain rate plastic deformation during LSP; (2) the highly dense dislocations with a uniform arrangement induced by DSA; (3) the high nucleation rate of nano-precipitates through DP ($10^4/\mu m^3$ [8]); and (4) the optimized pinning strength obtained by the post-shock tempering treatment.

To study these concepts, thermal engineered LSP was carried out on AISI 4140. The microstructures after processing with various processing conditions were characterized by TEM. The resulted mechanical properties including surface hardness, cyclic stability of surface strength and compressive residual stress and bending fatigue performance were measured and compared with WLSP. The mechanisms of fatigue performance after thermal engineered LSP were investigated. The precipitation kinetics as well as dislocation pinning effect affected by precipitate parameters were discussed.

Experiments

Sample Preparation:

The material used in this study was AISI 4140 steel with the following chemical compositions in wt %: C-0.41, Si-0.21, Mn-0.83, P-0.025, S-0.027, Cr-0.91, Mo-0.18, and Fe-balance. Before LSP, the samples were austenitized at 850° C. for 20 min and quenched down to room temperature in oil. A vacuum furnace was used to carry out tempering treatments by adjusting the tempering time and temperature. The sample dimensions were 76.2*10*2.38 mm.

Thermal Engineered LSP Process:

A Q-switched ND-YAG laser (Surelite III from Continuum, Inc.), operated at the wavelength of 1064 nanometer with a pulse width (full width at half maximum) of 5 nanoseconds was used to deliver the pulse laser energy. The laser beam diameter was 1 mm. The laser power intensity was adjusted by the Q-switched delay time. Aluminum foil with a uniform thickness of 30 microns was applied as the ablative coating. The foil was firmly attached to the sample surface by the vacuum grease. Instead of liquid confinements, BK7 glass with a high laser transmission coefficient was selected as the confining media. Note that it was more practical to utilize the silicon oil with a flash point over 600° F. as a confining media for industrial applications of WLSP, since the glass would likely be shattered by the laser-induced shock pressure. A hot plate was placed below the sample fixture to elevate the working temperature, which was monitored by a digital scientific thermometer. After WLSP, the samples were put in a vacuum furnace at controlled temperature for certain time.

Microstructure Characterization

Transmission electron microscopies (FEI-Tecnai TEM and FEI-Titan TEM operated at 200 kV and 300 kV respectively) were used to characterize the microstructures after processing. The focused ion beam (FIB) lift-out method was used to prepare the TEM samples in a FIB instrument (Nova-200). During TEM operation, the Gatan imaging filter (GIF) was utilized to exclude the inelastic scattered part to improve the quality of diffraction pattern and observe the weak diffraction spots originating from precipitates.

Mechanical Property Characterization

The surface hardness before and after processing were measured by Leco M-400-H micro-hardness test machine with a 25 gram load and a 10 second holding time.

The residual stresses were measured by a Bruker D8-Discover X-ray diffraction system using the characteristic X-ray source Co—$K_\alpha$. For the stress analysis, the peak was used corresponding to a 2θ angle of 123.916°, and 11 ψ angles from −50° to 50° were applied and analyzed by the $\sin^2\psi$ method. To study the cyclic stability of residual stress and surface strength, the residual stress and hardness were measured after different numbers of cyclic loading.

The fatigue properties were determined by the three-point bending fatigue tests carried out on a 100KN MTS servo-hydraulic fatigue machine. For all the tests, the load ration, which was defined as the minimum load divided by the maximum load, was set to be 0.10; the sample was subject to sinusoidally varying load cycles with a frequency of 10 Hz at room temperature; the maximal bending stress was calculated by $\sigma=3PL/2bh^2$, where P is the applied load, L is the span for the test set-up, b and h are the width and thickness of specimen.

Results and Discussion

Process Conditions

Warm Laser Shock Peening

Two useful parameters of WLSP process were the processing temperature and laser power intensity. This was because both DSA and DP effects during WLSP increased from the thermal energy provided by the warm processing temperature and the high strain rate plastic deformation caused by the laser-induced shock pressure. The effect of warm processing temperature (20° C.≤$T_{peen}$≤410° C.) during warm shot peening on mechanical properties of 4140 steel in terms of the half widths and surface compressive residual stress have been evaluated. The optimal peening temperature was found around 300° C. The optimal WLSP temperature of 4140 steel in terms of the surface strength was identified between 250 and 300° C. A softening effect was observed while the peening temperature was higher than 300° C. due to the thermal-induced dynamic recovery. Therefore, to avoid the dynamic recovery, 250° C. was used as the processing temperature for WLSP in this study.

To determine the laser intensity for WLSP, surface hardness after processing at 250° C. with laser intensities from 1.2 to 3.6 GW/cm² were measured as shown in FIG. 4.1. It was found the surface hardness increased with enhancing the laser power intensity. For instance, the surface hardness after WLSP increased from 342 to 367VH (kg/mm²) by enhancing the laser intensity from 1.2 to 3.6 GW/cm². This hardening effect was attributed to the strain hardening and also the dislocation pinning effect induced by the second phase nano-precipitates. The greater laser intensity generated the laser-induced plasma with a higher peak pressure, which enhanced the strain hardening and results in a greater nucleation rate. The laser-induced peak pressure, $P(I_0)$, as a function of the applied laser intensity, $I_0$, was estimated by the Fabbro's LSP model as $$P(I_0) = 0.10\left(\frac{\alpha}{2\alpha+3}\right)^{1/2} Z^{1/2} I_0^{1/2},$$

where α is the efficiency of the interaction. Z was the combined shock impedance defined as $Z=2/(1/Z_1+1/Z_2)$, where $Z_1$ and $Z_2$ were the shock impedances of the target material (4140 steel shock impedance 3.96e6 g cm⁻² s⁻¹) and the confining media (BK7 glass shock impedance 1.44e6 g cm⁻² s⁻¹), respectively. The estimated peak pressures for various laser intensities were plotted in FIG. 4.1. The maximum limit of surface hardness was observed while the peak pressure was over 4 GPa (corresponding to a laser intensity of 2.4 GW/cm²). This was due to the plastic deformation limit, which was reached when the magnitude of shock pressure was greater than two times of Hugoniot elastic limit (HEL) of target metal. This can also be referred to as the plastic deformation saturation phenomenon. LSP process on three aluminum alloys, gave plastic deformation reaching a maximum limit while the laser-induced shock pressure was above two times of HEL. In addition, BK 7 glass was cracked under a high laser power intensity (around 4 GW/cm²). Therefore, to obtain an optimal hardening effect while preventing to crack the confining media, 3 GW/cm² was utilized as the laser intensity for WLSP in this work.

Pre-Shock Tempering and Post-Shock Tempering

In order to discover the optimal tempering time and study how WLSP was assisted by tempering, the tempering treatments were carried out before and after WLSP, so called pre- and post-shock tempering. The resulting surface hardness affected by the tempering time was shown in FIG. 4.2. It was observed that both pre- and post-shock tempered samples could reach the peak hardness by 2 h tempering treatment. Compared to WLSP, 2 h post-tempering could further improve the surface hardness by 28% from 360 to 461VHN.

The hardening induced by pre-shock tempering was mainly due to the microstructure rearrangement, the formation of tempered martensites, and the diffusion of carbon atoms which were entrapped in the distorted body-centered-tetragonal (BCT) structure through quenching.

For the post-shock tempered samples, the hardening was attributed to the dislocation-assisted coarsening of nano-precipitates. Additionally, with a longer tempering time (longer than 2 hours), a helpful drop of surface hardness in post-shock tempered samples was seen. This was caused by the over-tempering effect, which dramatically decreased the precipitate number density and resulted in the thermal-induced reduction of dislocation density. The tempering effect on microstructure evolution and mechanical properties studied with details in the following sections. Furthermore, the magnitude of peak hardness of post-shock tempered sample (461VHN) was greater than that of pre-shock tempered ones (408VHN). Since the resistance to crack initiation and propagation was affected by the surface strength, 2 h post-shock tempering was selected as the optimal tempering condition for the fatigue performance.

Post-Shock Tempering Temperature

The post-shock tempering temperature was another useful processing parameter in thermal engineered LSP process. FIG. 4.3 shows the surface hardness affected by post-shock tempering temperature at various tempering time. A noticeable hardness drop was observed in the samples tempered at 550° C. This softening effect was attributed to the thermal-induced dynamic recovery, which leads to a helpful reduction of dislocation density. Favorable results were realized utilizing tempering temperatures from approximately 350° C. to approximately 450° C. However, compared to the samples tempered at 350° C., those tempered at 450° C. could reach the peak hardness with a greater magnitude in a shorter tempering time. For instance, the peak hardness of 450° C. tempered samples reached by 2 h post-shock tempering is 461VHN, while that of 350° C. tempered sample was 436VHN but requiring 4 h tempering treatment. In addition, the possibility of tempered martensite embrittlement in 4140 steel within the temperature range between 250 and 400° C. has was reported, which could accelerate the crack initiation. Therefore, to avoid the thermal recovery and obtain the peak hardness, 450° C. was used as the tempering temperature for thermal engineered LSP of 4140 steel.

Microstructures Beneath the Peened Surface

The mechanical properties of metallic materials were governed by the microstructure behaviors, such as the dislocations' collective motion and their interactions among themselves and with other crystal defects. It was useful to investigate the structural evolutions taking place during thermal engineered LSP at the zone directly beneath the peened surface. This compressive zone extends to a length scale of several hundred micrometers, which was significantly larger than the deformed layer. TEM images in FIG. 4.4 showed the initial microstructures of oil-quenched sample, in which dislocation structures with a low density were observed. The generation of these dislocations was majorly attributed to the crystal structure transition of steel from the face-centered cubic (austenite phase) to the body-centered tetragonal (martensite phase). The microstructure evolution in thermal engineered LSP process was analyzed by considering three processing stages: WLSP, the short time post-shock tempering and over-tempering.

Microstructures Generated by WLSP

FIG. 4.5 depicts weak beam dark field TEM images (FIGS. 4.5a and 4.5b) showing the entanglement of dislocations and spherical-shaped nano-precipitates in WLSP sample and the related diffraction pattern of two beam condition (FIG. 4.5c). It was discovered that the tangled dislocation structures with a high density and a uniformly distributed arrangement were formed rather than the dislocation pile-ups or shear bands, which were normally formed in metallic materials after to room temperature LSP due to the high strain rate deformation. This was mainly caused by the enhanced dislocation multiplication due to DSA. In WLSP, the warm processing temperature provides sufficient thermal energy for the diffusion of solute atoms (carbon) to dislocation cores. The migration of solute atoms results in the formation of Cottrell atmosphere, which exert a pinning force to resist the movement of nearby mobile dislocations. To continue the plastic deformation, the greater stress was useful to overcome the local resistance for dislocation motion. This led to the enhanced dislocation multiplication by activating more dislocation sources and generating new mobile dislocations.

The uniformly distributed dislocations resulted from DSA and also the pinning effect of highly dense nano-precipitates. These nano-precipitates (pointed out by arrows in FIG. 4.5a) were generated simultaneously during the laser-induced plastic deformation through DP. In WLSP, the high strain rate plastic deformation results in the formation of highly dense dislocation nodes, which were generally considered as the potential nucleation sites for precipitation. Both the warm processing temperature and high strain rate plastic deformation assist and accelerate nucleation growth during WLSP by decreasing the activation energy for precipitation. The details of nucleation kinetics affected by the processing temperature and laser shock are discussed in the precipitation kinetics section. Highly dense nano-precipitates were generated by WLSP due to DP. The size of these particles is around 5-10 nm in diameter, which were interpreted by the short aging time (in the scale of nano-second).

Microstructures Generated by Post-Shock Tempering

After WLSP, as found by the surface hardness test (FIG. 4.3), a short time post-shock tempering treatment (shorter than 2 hours) introduced a further hardening effect on the surface strength; on the other hand, a softening effect resulted from the long time post-shock tempering treatment (longer than 4 hours). It was helpful to understand this hardening and softening mechanism from the point of view of microstructure evolution during post-shock tempering.

The TEM images in FIG. 4.6 and FIG. 4.7 compare the microstructures induced by the short time (2 hours, FIG. 4.6) and the long time (6 hours, FIG. 4.7) post-shock tempering treatments in terms of dislocation and precipitate structures. It was observed that the dislocation structures in 2 h-tempered sample remain the relatively uniformly distributed arrangement, which was introduced through DSA during WLSP. The pile-ups of localized dislocations with a high density were formed in the 6 h-tempered sample. These dislocation pile-ups were also called dislocation walls (indicated by arrows in FIGS. 4.7a and 4.7b), which were generated due to the thermal-induced recovery of dislocations. This microstructure recovery could be identified in 2 h-tempered sample due to the presence of highly dense fine precipitates, which act as local obstacles interact elastically with nearby moving dislocations. The pinning effect made a sizeable contribution to resist the dislocation motion and retard the recrystallization normally induced during the heat treatment after deformation. In this way, the presence of precipitates helps to retain the deformed structure and accumulated strain. However, a long time post-shock tempering treatment induced the coarsening of precipitates with a helpful decrease in precipitate number density. This made the pinning effect less effective, and hence lead to the formation of dislocation walls and reduction of dislocation density. A similar phenomenon was observed in previous work after a short time post-deformation aging at the temperature up to 600° C., the equal-channel angular pressing (ECAP) structure of Cu—Cr—Zr alloy remains fine-grained and dislocation density remains high due to the improved thermal stability resulted from the pinning effect of nano-grains and nano-precipitates.

To have a better sight on the precipitate structures, a selected area diffraction (SAD) technique was applied to obtain the weak diffraction spots associated with the precipitate structures in the diffraction pattern. The dark field TEM images of typical precipitate structures in 2 h-tempered and 6 h-tempered samples were shown in FIGS. 4.6*c*, 4.6*d*, 4.7*c* and 4.7*d*. The selected weak spots were circled and indicated in diffraction patterns. The coarsening of precipitates during post-shock tempering was observed. For instance, the average size of precipitates in 6 h-tempered sample was around 100 nm in diameter, which was larger than that of 2 h-tempered sample (40-50 nm in diameter) and WLSP sample (5-10 nm in diameter). However, this coarsening phenomenon was accompanied with a helpful decrease of precipitate number density as compared by FIG. 4.6 and FIG. 4.7. In addition, it was discovered that the coarsening of precipitates takes place at the same region where localized dislocation pile-ups were formed. As observed from FIGS. 4.7*a* and 4.7*b*, the large particles (circled by rings) were mostly found along dislocation wall structures (indicated by arrows). This suggests a mutual influence of precipitates and dislocations: dislocation pile-ups provided favorable nucleation sites for the nucleation and coarsening of precipitates, while dislocation slips were restrained by the presence of precipitates due to the pinning effect. The HRTEM images of precipitates for 2 h post-shock tempered and 6 h post-shock tempered samples are shown in FIG. 4.6*a* and FIG. 4.8*b*

Coarsening of Precipitates

FIG. 4.8 shows the evolution of precipitate radius R, number density N and volume fraction $f_v$ with the post-shock tempering time. The data of number density were estimated by TEM images taken from the region close to the sample surface. For the WLSP sample, in which the fine particles could not be identified due to the small size, the number density was referred from the reported WLSP nucleation model. The volume fraction was calculated by $f_v = 4\pi R^3 N/3$. The results showed that the coarsening of precipitates with post-tempering time was accompanied by the linear decrease of particle number density, which was accordance with the Lifshitz-Slyozov-Wagner (LSW) theory ($n \propto t^{-1}$). Furthermore, a rapid increase in volume fraction at the beginning of tempering process was observed, followed by a slowdown at longer tempering time. The similar phenomenon was reported in a study of the behaviors of the hardening precipitates in Mg—Y—Nd alloy during aging treatments. It was found that at the early stage of aging treatment, a rapid increase of precipitate volume fraction was accompanied by a linear decrease of particle number density.

Precipitation Kinetics

In the nucleation stage, as a dynamic precipitation process, the nucleation of precipitates was dislocation-assisted, and the dislocation nodes formed by deformation were favored nucleation sites for precipitation. The available nucleation site density $N_0$, employed to describe the sites where it was possible for the nucleation to take place, was one of the parameters for the nucleation kinetics. With the consideration of laser intensity and processing temperature effects, the available nucleation site density could be expressed as:

$$N_0(I_0, T) = \frac{1}{2}\rho(I_0, T)^{3/2} = \left(\frac{\sigma(T, I_0) - \sigma_0}{M\gamma\mu b}\right)^2 \quad (1)$$

where M was the Taylor factor ($\approx 3.10$), $\mu$ and b are the shear modulus and Burgers vector of dislocations, $\gamma$ was a scalar coefficient between 0.2 and 0.4, and $\sigma$ was the flow stress of metallic materials after processing affected by laser intensity $I_0$ and processing temperature T, and $\sigma_0$ was the intrinsic friction stress contributing to the flow stress.

Besides the available nucleation site density, the nucleation rate was also determined by the nucleation coefficient, which was affected by the processing temperature and the activation energy for nucleation. Accordingly, the nucleation rate could be obtained by:

$$\frac{dN}{dt}\lambda(T)\cdot N_0 \quad (2)$$

$$\lambda(T) = Z'\beta'\exp\left(-\frac{\Delta G}{kT}\right)\exp\left(-\frac{\tau}{t}\right) \quad (3)$$

where N was the number of precipitates per unit volume, $\lambda(T)$ is the nucleation coefficient (between 0 to 1) affected by the processing temperature, Z' was Zeldovich's factor, t and $\beta'$ was the time and atomic impingement rate, and r was the incubation period. The activation energy for nucleation $\Delta G$ was consisted of four components:

$$\Delta G = V(\Delta G_{chem} + \Delta G_c) + \gamma_i - \Delta G_d \quad (4)$$

where V is the volume of nucleus, $\Delta G_{chem}$, $\Delta G_E$, $\gamma_h$ and $\Delta G_d$ are the chemical driving force, volume strain energy, interfacial free energy and dislocation core energy relatively.

With utilizing of the extended mechanical threshold stress (MTS) model for flow stress (feasible for the ultra high strain rate deformation greater than $10^5$/s) and Fabbro's LSP model for laser shockwave peak pressure, the nucleation rate during WLSP was numerically calculated and verified by experiments. Both calculation results and experimental observations confirm that the nucleation kinetics was assisted and accelerated by the deformation-induced dislocations and the elevated processing temperature. This could potentially be understood by the following reasons from the activation energy point of view. First of all, the activation energy for nucleation was reduced by the increased dislocation core energy caused by the stronger dislocation interactions. The dislocation core energy stored in dislocation nodes during the mechanical deformation was released for the nucleation growth in the precipitation process. With a higher dislocation density induced by the laser shock, a greater dislocation core energy is stored in dislocation nodes, resulting in a lower requirement of external applied energy for nucleation. Furthermore, the activation energy for nucleation was reduced by the presence of highly dense dislocations due to the reduced volume strain energy. The volume strain energy related to the matrix/precipitate lattice mismatch was proportional to the elastic lattice dis-registry and inversely proportional to the coherency loss parameter. While the precipitates were surrounded by highly dense dislocations, the matrix/precipitate interface was semi-coherency, which means a lower elastic lattice dis-registry and a greater value of coherency loss parameter. This leads to the reduced volume strain energy for nucleation. In addition, the activation energy for nucleation was reduced by the elevated processing temperature due to the lower chemical driving force. The chemical driving force represents the free energy difference between matrix and precipitates. Before reaching the equilibrium temperature (at which the free energy of matrix and precipitate phase were equal), the excess free energy provided by matrix (unstable phase) relative to the precipitate (stable phase) was reduced by increasing temperature.

In the coarsening stage, the coarsening apparently took place at the dislocation nodes, since the precipitates were interconnected through the dislocation network. The effective diffusion coefficient was contributed from the bulk diffusion and also the pipe diffusion through dislocations. The effective diffusivity $D_e$ was expressed as:

$$D_e = D_b + (D_p - D_b) \pi R_{core}^2 \rho \tag{5}$$

where $D_b$ was the bulk diffusivity, $D_p$ was the pipe diffusion coefficient, $R_{core}$ was the radius of the dislocation core, and $\rho$ was the total dislocation density. Based on the classic precipitation theory, the coarsening rate expressed by precipitate radius and number density evolutions were obtained as:

$$\frac{dR}{dt_{coarsening}} = \frac{4C^e R_0 D_e}{27 C^p - C^e R^2} \tag{6}$$

$$\frac{dR}{dt_{coarsening}} = \frac{4C^e R_0 D_e}{27 C^p - C^e R^3} \left[ \frac{R_0 C}{R(C^p - C)} \left( \frac{3}{4 \pi R^3} - N \right) - 3N \right] \tag{7}$$

where $C^e$ was the equilibrium concentrations of carbon at the annealing temperature, $C^p$ was the concentration of carbon in precipitate, and C was the solute concentration of carbon. The effect of prior deformation on precipitation kinetics at the coarsening stage was numerically investigated taking care of both the bulk diffusion and the pipe diffusion. It was found that, for the prior deformed 0.084C-0.015N-0.06Nb steel sample subjected to the annealing treatment, the growth of precipitate size was more helpful in the long annealing time regime than that in the short time regime, and the precipitate number density increased rapidly at the early stage of annealing, followed by a notable decrease at the longer annealing time. The similar coarsening phenomenon is observed by TEM images before. In-depth study of the coarsening mechanism during the post-shock tempering treatment played a useful role for theoretically understanding the microstructure evolution during thermal engineered LSP process.

Effect of Dislocation Pinning on Mechanical Performances

Dislocation Pinning Strength Affected by Particle Parameters

Strengthening due to second phase precipitates has been examined. At low temperatures, dislocation overcomes local obstacles by cutting through or looping around mechanisms. The former process took place predominantly for small precipitates with low density, while the latter for large precipitates with high density. In the case of cutting mechanism, the Friedel model can be applied to estimate the critical shear stress $\tau_c$, which could be expressed as $$\tau_c = C \frac{F_{max}^{3/2} (DN)^{1/2}}{b(12S)^{1/2}} \tag{8}$$

where S was the linear tension of the dislocation, b was the magnitude of the Burgers vector, D and N were the size and volume number density of precipitates, C~1 was a constant, and $F_{max}$ was the maximum value of dislocation/particle interaction force. Eq. 8 suggests that the critical shear stress with a greater magnitude can be useful for the dislocation movement in the metal matrix containing precipitates with a higher number density and larger sizes. For small particles, the strengthening induced by cutting may be contributed by at least two mechanisms: (1) the stress fields induced by particles, and (2) the modulus interaction between dislocation and particle, which resulted in that the maximum force proportional to the difference in the elastic moduli of matrix and precipitate ($F_{max} \sim \Delta\mu/\mu$). With the increase of particle size, the dislocation appeared to be pinned inside the precipitate while cutting through, resulting in a notable increase of the critical shear stress as compared to that induced by modulus interaction. This lead to the changeover of dislocation/precipitate interaction mechanism from cutting through to Orowan looping, which left obstacles surrounded by pinned dislocation loops after bypassing. The strengthening contribution of particles in looping around process was mainly considered by the critical resolved shear stress $\tau_p$ (the minimal external stress for overcoming dislocation/precipitate interaction force) as a function of the mean particle radius r and volume fraction f. The advanced $\tau_p$ function based on the worked was as follows, which takes into account the actual distribution of particle sizes.

$$\tau_p(r, f) = \frac{0.9 b \mu}{2 \pi w_L r \sqrt{1-v}} \ln\left(\frac{2 w_D r}{b}\right) \left[\frac{\ln(2 w_D r / b)}{\ln(w_L r / b)}\right]^{1/2}$$

with $$w_L = \sqrt{\pi w_q / f} - 2w, \quad w_D^{-1} = w_L^{-1} + (2 w_r)^{-1} \tag{9}$$

where $\mu$ and $v$ were the shear modulus and Poisson ratio of matrix, $w_r$ and $w_q$ were the mean radius and the mean area of the particle intersection with the glide plane. In the case of Orowan looping, a greater critical resolved shear stress was required with the increase of particle size and volume fraction. With a larger particle size, the particle-induced stress field was enhanced, and the bigger dislocation loops had to be formed after bypassing; with a higher particle volume fraction, dislocations had to bend more strongly due to the less free space between particles. Therefore, a higher external stress was required for overcoming the dislocation/precipitate interaction. A multi-scale discrete dislocation dynamic simulation was utilized to investigate the particle/dislocation interaction during laser peening process. The dislocation pinning effect on the microstructure evolution and material stress-strain curves were studied by initially inserting precipitates with various sizes, densities and volume fractions into the computational cells. With the consideration of precipitate volume fraction, the optimal pinning strength was determined by the balance between the particle size and number density effects. It was worthwhile utilizing thermal engineered LSP experiments to verify the simulated strengthening effect by considering the surface hardness (FIG. 4.2) and also the cyclic stability of surface strength and residual stress.

Cyclic Stability of Surface Strength and Residual Stress

Besides the magnitude and depth, the stability of compressive residual stress played another role in determining the fatigue performance of metallic materials. FIG. 4.9 compares the residual stress relaxation during the cyclic loading at 1400 MPa maximal three-point bending stress of WLSP and 2 h post-shock tempered samples. Compared to WLSP samples with no additional tempering, the initial residual stress before cyclic loading of 2 h post-shock tempered samples had a lower magnitude. This stress relaxation was mainly caused by the thermal-induced diffusional creep and dislocation glide during the tempering process.

However, a large stress relaxation was seen in WLSP samples with increasing cyclic loading numbers. For example, after 100 k cyclic loading the residual stress of WLSP samples decreased by 43.9% from 421 to 236 MPa, while that of 2 h tempered samples decreased by 21.6% from 357 to 280 MPa. These results demonstrated that a higher cyclic stability of residual stress was achieved by 2 h post-shock tempering treatment. In WLSP samples, the cyclic residual stress relaxation was mainly due to the micro-plastic strains accumulating from cycle to cycle, while in 2 h tempered samples, the presence of larger size precipitate could effectively resist material's plastic behaviors by locking mobile dislocations. In addition, the stress relaxation occurred when the superposition of the loading stress, residual stress and dislocation pinning stress exceeds material's yield stress. Therefore, for 2 h tempered sample, with the same loading stress and a lower initial residual stress, the suppressed stress relaxation was attributed to the enhanced pinning stress. This improvement makes a significant contribution for a better fatigue performance.

The stability of surface strength was also useful for the effective fatigue improvements by determining the resistance to crack initiation. The surface hardness changed with the cyclic loading of samples processed by various conditions was shown in FIG. 4.10. It was of interest to notice that in the first 100 cycles, a helpful hardening effect was induced by cyclic loading in 2 h tempered samples, while no such phenomenon was observed in WLSP samples. It was generally accepted that the cyclic hardening was attributed to the dislocation multiplication, dislocation mutual interaction and/or the precipitate/dislocation interaction. Both WLSP and 2 h tempered samples contain the highly dense dislocations, but the precipitate size of 2 h tempered sample was 4 times larger than that of WLSP sample. Therefore, the noticeable cyclic hardening in 2 h tempered sample can be explained by the enhanced pinning effect from the precipitate coarsening. The resulted larger particles exert a greater pinning force to resist the movement of dislocations during the cyclic loading. To continue the plastic behavior, the generation of more mobile dislocations was necessary, resulting in the enhanced dislocation multiplication. This contributed to a greater surface hardness. After 100 cycle loadings, a softening effect of surface hardness was observed with increasing cycle numbers in both WLSP and 2 h tempered samples. However, compared to WLSP sample, the 2 h tempered sample had a lower softening rate, which indicated a higher cyclic stability of surface strength. For example, after 100K cycle loadings, the hardness of WLSP sample reduced by 33.1% from 344 to 230VHN, while that of 2 h-post tempered sample only had a 4.4% reduction from 452 to 432VHN. This cyclic softening effect could be explained by the annihilation of dislocations or the rearrangement of dislocations to subgrains. Due to the presence of larger size precipitates, the movement and rearrangement of dislocations is resisted by the pinning strength, resulting in the suppressed cyclic softening effect. Therefore, a higher cyclic stability of surface hardness was achieved by 2 h post-shock tempering treatment, which aspects to the fatigue performance through the resistance to crack initiation and propagation.

Fatigue Test

The three-point bending fatigue performances that are obtained after various processing conditions are depicted in the stress-lifespan (S—N) curves in FIG. 4.11. It was shown that compared to WLSP, a better fatigue performance is achieved by 2 h post-shock tempering treatment. For example, under the certain stress magnitude from 1500 MPa to 1750 MPa, the fatigue life of 2 h tempered specimens are 2-10 times higher than that of WLSP specimens. In addition, the bending fatigue strength of 4140 steel after 2 h post-shock tempering was enhanced by 200 MPa from 1300 MPa to 1500 MPa. This helpful improvement was 2 times greater than that induced by WLSP relative to LSP. Note that, compared to LSP, WLSP improves the bending fatigue strength of 4140 steel by 75 MPa. The improved fatigue strength was of interest because it is not in keeping with the commonly held concept that the specimen after WLSP with a higher magnitude of compressive residual stress (as shown in FIG. 4.9) should exhibit a better fatigue performance, and 2 h post-shock tempering treatment should have a negative effect on fatigue strength due to the thermal-induced stress relaxation. According to the previous TEM images and cyclic stability study, the improvement of fatigue performance appears to be substantially due to the enhanced dislocation pinning effect resulted from the coarsening of precipitates during tempering. The resulting larger size precipitates exert a greater pinning force to stabilize dislocation structures during cyclic loading. As a result, the applied stress with higher amplitude was needed to overcome the pinning effect to induce the movement of dislocations. Meanwhile, the crack initiation was resisted by the greater surface hardening, and the crack propagation was suppressed by the compressive residual stress with higher cyclic stability. Therefore, a better fatigue performance was achieved by 2 h post-shock tempering. On the other hand, a longer time post-shock tempering had a negative effect on the fatigue performance. As observed from FIG. 4.11, the S—N curve of 4 h tempered sample moves to the left of that of 2 h tempered sample. Additionally, compared to 2 h tempered specimens, the fatigue strength after 4 h post-shock tempering was decreased by 100 MPa. This negative effect is attributed to the helpful reduction of particle number density during longer time tempering treatment, which lead to a softening effect on the pinning strength.

Therefore, with carefully manipulated processing conditions, the optimal microstructures with the optimized pinning effect of metallic materials could be reached by thermal engineered LSP for mechanical applications including enhancing the surface hardness, improving the cyclic stability of surface strength and residual stress, and extending the fatigue life. Compared to other surface processing techniques like shot peening, deep rolling, LSP etc, thermal engineered LSP has a higher potential to reach the optimized mechanical properties, since this technique integrates the following advantages: (1) the effective strain hardening effect and the high magnitude and in-depth compressive residual stress produced during LSP; (2) dynamic strain aging for the highly dense dislocations with a uniform arrangement; (3) dynamic precipitation for the high nucleation rate of nano-precipitates; and (4) the post-shock tempering for the optimized pinning strength. Thermal engineered LSP should have many beneficial industrial applications.

Thermal Engineered Laser Shock Peening Conclusion

Thermal engineered LSP was carried out on AISI 4140, and the resulting mechanical improvements were evaluated. The mechanisms of fatigue performance after thermal engineered LSP were investigated. Thermal engineered LSP combines WLSP with the followed post-shock tempering treatment to extend the precipitation kinetics from the nucleation stage to the coarsening stage. In the nucleation stage, both DP and DSA effects lead to the formation of highly dense nano-precipitates surrounded by highly dense dislocations. In the coarsening stage, with the assistance of dense dislocations, the precipitate size grows larger, while the number density is decreased. By carefully manipulating tempering conditions, the precipitate size and number density effects on the dislocation pinning strength could be balanced to obtain the optimized pinning strength, which effectively contributes to stabilize microstructures by locking mobile dislocations during cyclic loading. As a result, the cyclic stability of surface strength and compressive residual stress induced by laser shock is improved, and thus the fatigue life is extended. According to mechanical test results, 2 h post-shock tempering at 450° C. after WLSP leads to the optimized microstructure of AISI 4140. Compared to WLSP, 2 h post-shock tempering could further enhance the surface hardness by 28%, and improve the fatigue limit by 200 MPa.

Various aspects of different embodiments of the present disclosure are expressed in paragraphs X1, X2 and X3 as follows:

X1. One embodiment of the present disclosure includes an apparatus for hardening a material, comprising: a heater that heats the material to a desired temperature; and a laser oriented to emit a beam of laser energy toward the material; wherein the laser generates a plasma proximate the material and deforms the surface of the heated material.

X2. Another embodiment of the present disclosure includes an apparatus for hardening a material, comprising: a cooling member that cools the material to a desired temperature; and a laser oriented to emit a beam of laser energy toward the material; wherein the laser generates a plasma proximate the material and deforms the surface of the cooled material.

X3. A further embodiment of the present disclosure includes an apparatus for hardening a material, comprising: a container adapted to contain a liquid active agent as the agent covers the material; and a laser oriented to emit a beam of laser energy through the active agent; wherein the laser decomposes at least a portion of the active agent, creates a shock, and deforms the surface of the material Yet other embodiments include the features described in any of the previous statements X1, X2 or X3, as combined with one or more of the following aspects:

Wherein the heater maintains the desired temperature at a temperature that maximizes the density of nanoprecipitation.

Wherein the desired temperature is at least 20 deg. C. and at most 400 deg. C.

Wherein the material is an aluminum alloy and the desired temperature is at least approximately 150 deg. C. and at most approximately 200 deg. C.

Wherein the material is steel and the desired temperature is at least approximately 250 deg. C. and at most approximately 400 deg. C.

Wherein the temperature is maintained within 20 deg. C. of the desired temperature.

Wherein the temperature is maintained within 20 deg. K of the desired temperature.

Wherein the heater heat tempers the material after said deforming.

Wherein the heat tempering includes heating the material to at least 250 deg. C. and at most 450 deg. C. for at least 2 hours.

Wherein the heat tempering includes heating the material to approximately 450 deg. C. for approximately 2 hours.

Wherein the heater heat tempers the material prior to said deforming.

Wherein nanomaterials are generated.

Wherein the desired temperature is selected to maximize mechanical twining in the material.

Wherein the desired temperature is at least 50 deg. K and at most 250 deg. K.

Wherein the active agent is in direct physical contact with the material.

Wherein the material is covered with an ablative member positioned between the material and the active agent.

Wherein a plasma is generated with the laser energy.

Wherein the active agent is a liquid during said emitting.

Wherein the active agent is hydrogen peroxide.

Reference systems used herein may refer generally to various directions (e.g., upper, lower, forward and rearward), which are merely offered to assist the reader in understanding the various embodiments of the disclosure and are not to be interpreted as limiting. Other reference systems may be used to describe various embodiments, such as referring to the direction of projectile movement as it exits the firearm as being up, down, rearward or any other direction.

While examples, one or more representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Features of one embodiment may be used in combination with features of other embodiments as would be understood by one of ordinary skill in the art, whether or not explicitly described as such. One or more exemplary embodiments have been shown and described, and all changes and modifications that come within the spirit of the disclosure are desired to be protected.

What is claimed is:

1. A method for hardening a material, comprising:
selecting a desired temperature to maximize a density of nanoprecipitation in a material, wherein the desired temperature is less than a recrystallization temperature of the material and greater than room temperature;
heating, using a heater, the material to the desired temperature, wherein the desired temperature is at least 20 deg. C. and at most 400 deg. C., and maintaining the desired temperature, using the heater;
emitting a pulse of laser energy toward the material, the material being maintained at the desired temperature, the pulse having a duration of less than 100 nanoseconds;
generating a plasma with the laser;
confining the plasma with a confining material, wherein the confining material includes fused quartz or silicone oil, and wherein expansion of the confined plasma generates a shock wave proximate the surface of the material;
deforming a surface of the material as a result of the shockwave; and
generating nanoprecipitates internal to said material by said deforming at the desired temperature;
wherein the heater is distinct from the source of the pulse of laser energy.

2. The method of claim 1, wherein the material is an aluminum alloy and the desired temperature is at least approximately 150 deg. C. and at most approximately 200 deg. C.

3. The method of claim 1, wherein the material is steel and the desired temperature is at least approximately 250 deg. C. and at most approximately 400 deg. C.

4. The method of claim 1, comprising:
maintaining the material at a temperature within 20 deg. C. of the desired temperature.

5. The method of claim 1, comprising:
heat tempering the material after said deforming.

6. The method of claim 5, wherein said heat tempering includes heating the material to at least 250 deg. C. and at most 450 deg. C. for at least 2 hours.

7. The method of claim 5, wherein said heat tempering includes heating the material to approximately 450 deg. C. for approximately 2 hours.

8. The method of claim 1, comprising:
heat tempering the material prior to said deforming.

9. The method of claim 1, comprising:
emitting a plurality of pulses of laser energy toward the material, the duration of each pulse being less than 100 nanoseconds.

10. The method of claim 1, comprising:
coating the surface of the material with an ablative coating before said emitting.

11. The method of claim 10, wherein the ablative coating is selected from the group consisting of: metallic foil, organic paint and adhesive.

12. The method of claim 10, wherein the ablative coating includes metallic foil, organic paint or adhesive.

13. The method of claim 10, which further comprises confining the surface of the material before said emitting.

14. The method of claim 1, wherein said deforming the surface is plastically deforming the surface.

15. The method of claim 14, wherein said deforming the surface is near-surface deformation.

16. The method of claim 1, which further comprises dynamically precipitating a microstructure of the material by said deforming.

17. The method of claim 1, which further comprises dynamically strain aging a microstructure of the material by said deforming.

18. The method of claim 1, which further comprises hardening the surface of the material as a result of said deforming.

19. The method of claim 1, which further comprises confining the surface of the material before said emitting.

20. The method of claim 1, which further comprises hardening the surface of the material as a result of said deforming.

21. The method of claim 1, wherein the confining material is silicone oil.

* * * * *